US012659934B2

(12) United States Patent
Zhang et al.

(10) Patent No.: US 12,659,934 B2
(45) Date of Patent: Jun. 16, 2026

(54) TRANSMISSION METHOD FOR TRIGGER SIGNALING

(71) Applicant: GUANGDONG OPPO MOBILE TELECOMMUNICATIONS CORP., LTD., Dongguan (CN)

(72) Inventors: Shichang Zhang, Dongguan (CN); Zhenshan Zhao, Dongguan (CN); Yi Ding, Dongguan (CN); Huei-Ming Lin, Victoria (AU)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 373 days.

(21) Appl. No.: 18/205,973

(22) Filed: Jun. 5, 2023

(65) Prior Publication Data

US 2023/0319788 A1      Oct. 5, 2023

Related U.S. Application Data

(63) Continuation of application No. PCT/CN2020/134696, filed on Dec. 8, 2020.

(51) Int. Cl.
*H04W 4/00* (2018.01)
*H04L 5/00* (2006.01)
(Continued)

(52) U.S. Cl.
CPC ........... *H04W 72/02* (2013.01); *H04L 5/0053* (2013.01); *H04W 72/1263* (2013.01); *H04W 72/25* (2023.01); *H04W 72/566* (2023.01)

(58) Field of Classification Search
CPC . H04W 72/02; H04W 72/25; H04W 72/1263; H04L 5/0053
See application file for complete search history.

(56) References Cited

U.S. PATENT DOCUMENTS

2020/0221543 A1* 7/2020 Wei ...................... H04W 76/14
2020/0322024 A1 10/2020 Cheng et al.
(Continued)

FOREIGN PATENT DOCUMENTS

CN      104918330 A      9/2015
CN      107659965 A      2/2018
(Continued)

OTHER PUBLICATIONS

China National Intellectual Property Administration, First office action of Chinese application No. 202311339012.2 issued on Nov. 5, 2024.
(Continued)

*Primary Examiner* — Elisabeth Benoit Magloire
(74) *Attorney, Agent, or Firm* — Sheppard, Mullin, Richter & Hampton LLP

(57) ABSTRACT

The embodiments of the present disclosure provide a wireless communication method and a terminal. The method includes: determining, by a first terminal, whether the first terminal satisfies a condition for transmitting trigger signaling, the trigger signaling instructing a second terminal to transmit assistance information for assisting the first terminal in resource selection; and transmitting, by the first terminal, the trigger signaling when the first terminal satisfies the condition for transmitting the trigger signaling. When the first terminal satisfies the condition for transmitting the trigger signaling, the first terminal transmits the trigger signaling, i.e., to trigger the transmission of the trigger signaling based on the condition. It is possible to support transmission of the trigger signaling in a variety of different situations, so as to avoid unnecessary transmission of assistance information by the second terminal, thereby improving the overall performance of the entire system.

20 Claims, 5 Drawing Sheets

100

(51) Int. Cl.
| | |
|---|---|
| *H04W 72/02* | (2009.01) |
| *H04W 72/1263* | (2023.01) |
| *H04W 72/25* | (2023.01) |
| *H04W 72/566* | (2023.01) |

(56) References Cited

U.S. PATENT DOCUMENTS

| | | | | |
|---|---|---|---|---|
| 2021/0014831 A1* | 1/2021 | Ryu | | H04L 5/0092 |
| 2021/0105800 A1* | 4/2021 | Zhao | | H04W 72/0446 |
| 2021/0135928 A1* | 5/2021 | Yi | | H04W 72/23 |
| 2021/0144582 A1* | 5/2021 | Yi | | H04W 28/0278 |
| 2021/0204217 A1* | 7/2021 | Balasubramanian | | |
| | | | | H04W 72/04 |
| 2022/0150730 A1* | 5/2022 | Freda | | H04L 1/188 |
| 2022/0174690 A1* | 6/2022 | Wang | | H04W 72/20 |
| 2022/0174711 A1* | 6/2022 | Wang | | H04L 43/16 |
| 2022/0225290 A1* | 7/2022 | Ganesan | | H04W 24/10 |
| 2022/0256548 A1* | 8/2022 | Park | | H04W 72/542 |
| 2022/0279536 A1* | 9/2022 | Khsiba | | H04W 72/1263 |
| 2022/0369417 A1* | 11/2022 | Park | | H04W 52/0216 |
| 2022/0394559 A1* | 12/2022 | Lee | | H04W 72/56 |
| 2023/0371090 A1* | 11/2023 | Miao | | H04W 76/14 |
| 2023/0379887 A1* | 11/2023 | Zhao | | H04W 72/25 |
| 2023/0397230 A1* | 12/2023 | Yu | | H04L 1/1861 |
| 2024/0023069 A1* | 1/2024 | Hu | | H04W 76/28 |

FOREIGN PATENT DOCUMENTS

| | | |
|---|---|---|
| CN | 107666681 A | 2/2018 |
| CN | 108632781 A | 10/2018 |
| CN | 110089174 A | 8/2019 |
| CN | 111294162 A | 6/2020 |
| CN | 111901783 A | 11/2020 |
| CN | 114071407 B * | 1/2025 ........... H04L 1/1896 |
| EP | 4221271 A1 * | 8/2023 ............ H04W 72/02 |
| WO | 2020199903 A1 | 10/2020 |

OTHER PUBLICATIONS

Extended European Search Report dated Jan. 3, 2024 received in European Patent Application No. EP20964555.5.

Lenovo et al: "Sidelink resource allocation for Reliability enhancement", 3GPP Draft; R1-2008918, 3rd Generation Partnership Project (3GPP), Mobile Competence Centre; 650, Route Des Lucioles; F-06921 Sophia-Antipolis Cedex; France vol. RAN WG1, No. e-Meeting; Oct. 26, 2020-Nov. 13, 2020 Oct. 24, 2020 (Oct. 24, 2020), XP051946730.

International Search Report and Written Opinion dated Aug. 30, 2021 in International Application No. PCT/CN2020/134696. English translation attached.

Moderator (LG Electronics), "Feature lead summary for AI 8.11.2.2 Feasibility and benefits for mode 2 enhancements", #3GPP TSG RAN WG1 #103-e R1-2009788, Nov. 23, 2020.

Huawei, HiSilicon, "Inter-UE coordination in sidelink resource allocation", 3GPP TSG RAN WG1 Meeting #103-e R1-2007616, Nov. 3, 2020.

Samsung, "On Feasibility and Benefits for Mode2 Enhancements", 3GPP TSG RAN WG1 #103-e R1-2008190, Nov. 3, 2020.

Ericsson, "Feasibility and benefits of mode 2 enhancements for inter-UE coordination", 3GPP TSG-RAN WG1 Meeting #103-e R1-2009073, Nov. 3, 2020.

Qualcomm Incorporated, "Reliability and Latency Enhancements for Mode 2", 3GPP TSG RAN WG1 Meeting #103-e R1-2009273, Nov. 3, 2020.

VIVO, "Discussion on mode 2 enhancements", 3GPP TSG RAN WG1 #103-e R1-2007689, Nov. 3, 2020.

LG Electronics, "Discussion on feasibility and benefits for mode 2 enhancement", 3GPP TSG RAN WG1 Meeting #103-e R1-2007896, Nov. 3, 2020.

* cited by examiner

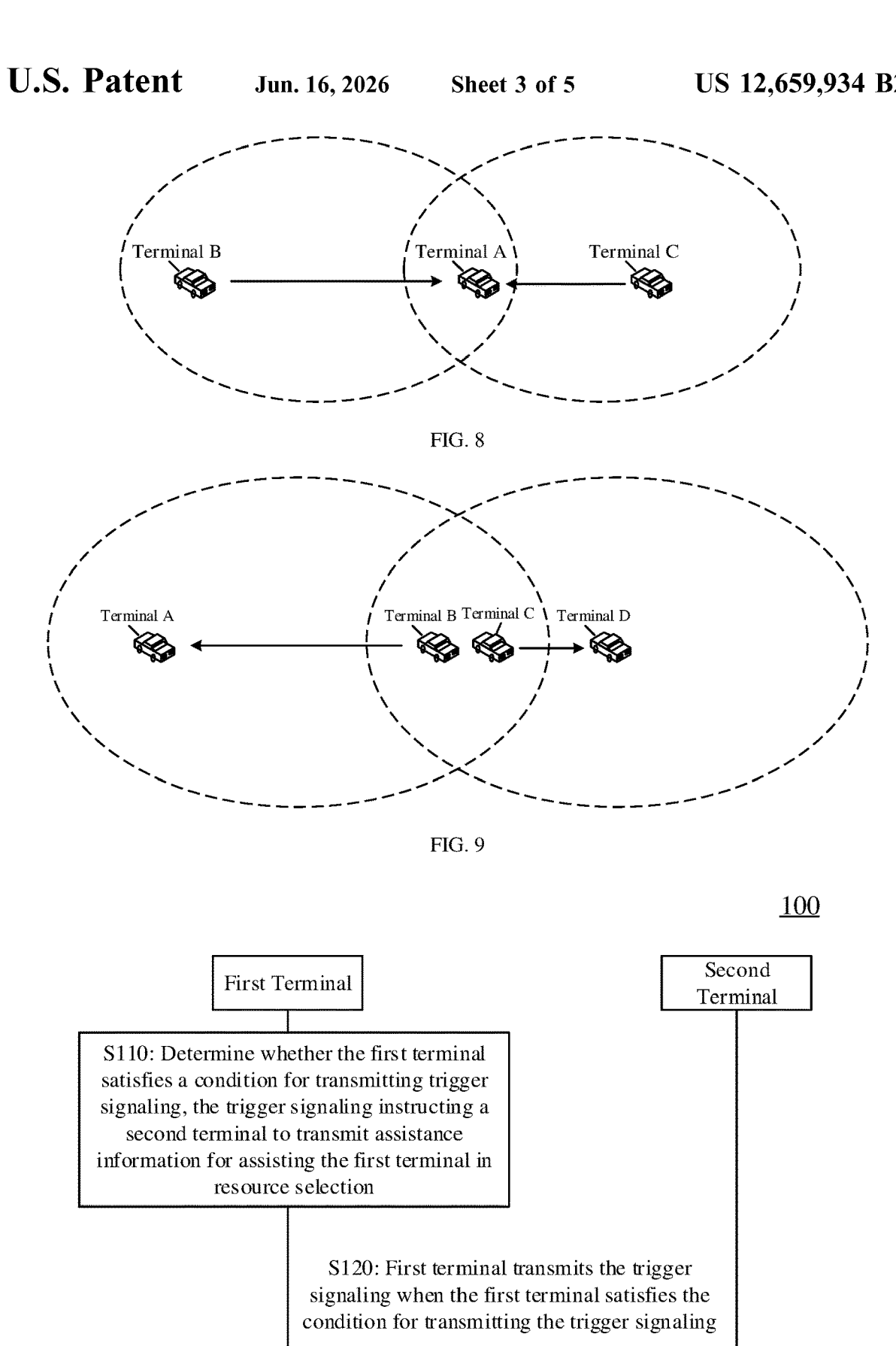

First Terminal

Second Terminal

S110: Determine whether the first terminal satisfies a condition for transmitting trigger signaling, the trigger signaling instructing a second terminal to transmit assistance information for assisting the first terminal in resource selection S120: First terminal transmits the trigger signaling when the first terminal satisfies the condition for transmitting the trigger signaling

FIG. 10

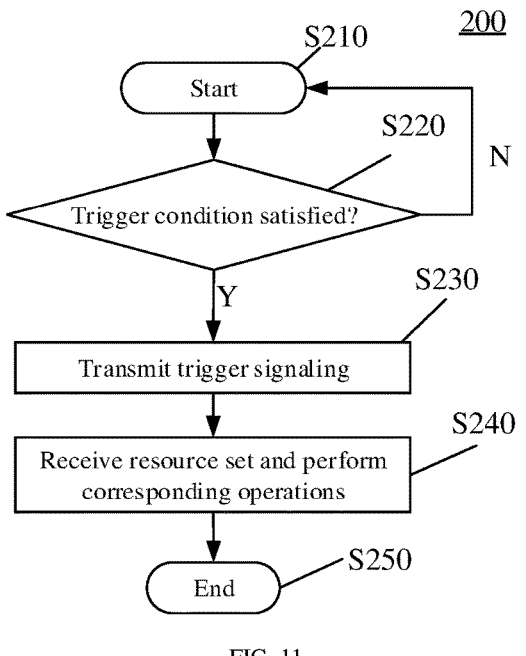
FIG. 11
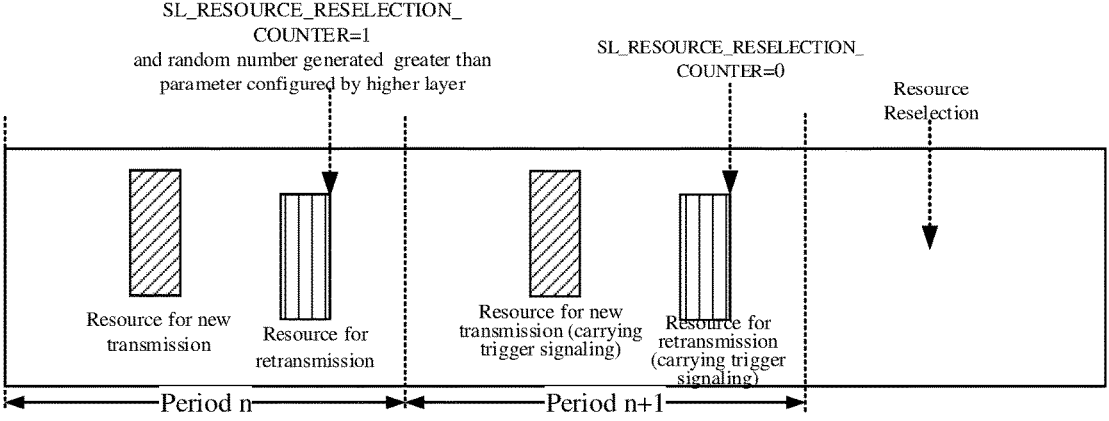
FIG. 12
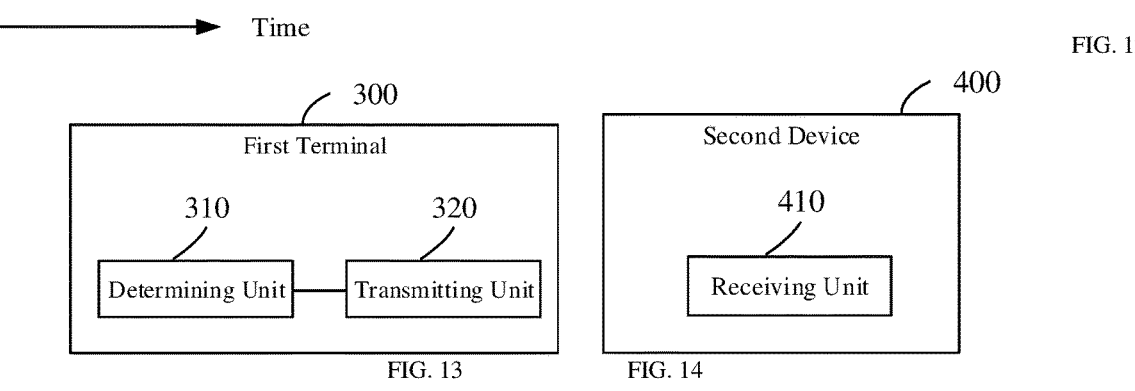
FIG. 13                    FIG. 14

TRANSMISSION METHOD FOR TRIGGER SIGNALING

CROSS-REFERENCE TO RELATED APPLICATIONS

This application is a continuation of International Application No. PCT/CN2020/134696 filed on Dec. 8, 2020, the entire disclosure of which is incorporated herein by reference.

TECHNICAL FIELD

The embodiments of the present disclosure relate to communication technology, and more particularly, to a wireless communication method and a terminal.

BACKGROUND

Device-to-Device communication is a Sidelink (SL) transmission technology based on Device to Device (D2D), which is different from traditional cellular systems where communication data is received or transmitted via base stations and thus has higher spectral efficiency and lower transmission delay. The Internet of Vehicles system adopts D2D direct communication. The 3rd Generation Partnership Project (3GPP) defines two transmission modes, a first mode and a second mode. In the transmission of the second mode, the terminal randomly selects transmission resources from a resource pool, or selects transmission resources according to a listening result. This resource selection scheme can avoid interference between terminals to a certain extent.

In New Radio (NR) Vehicle to Everything (V2X), it is desired to support autonomous driving, and thus higher requirements, such as higher throughput, lower delay, higher reliability, larger coverage, and more flexible resource allocation, are imposed on data interaction between vehicles. Therefore, it is necessary to further improve the D2D direct communication to improve system performance.

SUMMARY

Embodiments of the present disclosure provide a wireless communication method and a terminal, capable of enhancing system performance by improving the second mode.

In a first aspect, a wireless communication method is provided. The method includes: determining, by a first terminal, whether the first terminal satisfies a condition for transmitting trigger signaling, the trigger signaling instructing a second terminal to transmit assistance information for assisting the first terminal in resource selection; and transmitting, by the first terminal, the trigger signaling when the first terminal satisfies the condition for transmitting the trigger signaling.

In a second aspect, a wireless communication method is provided. The method includes: receiving, by a second terminal, trigger signaling instructing the second terminal to transmit assistance information for assisting a first terminal in resource selection.

In a third aspect, a first terminal is provided. The first terminal is configured to perform the method according to the above first aspect or any implementation thereof. In particular, the first terminal includes one or more functional modules configured to perform the method according to the above first aspect or any implementation thereof.

In a fourth aspect, a second terminal is provided. The second terminal is configured to perform the method according to the above second aspect or any implementation thereof. In particular, the second terminal includes one or more functional modules configured to perform the method according to the above second aspect or any implementation thereof.

In a fifth aspect, a first terminal is provided. The first terminal includes a processor and a memory. The memory has a computer program stored thereon, and the processor is configured to invoke and execute the computer program stored in the memory to perform the method according to the above first aspect or any implementation thereof.

In a sixth aspect, a second terminal is provided. The second terminal includes a processor and a memory. The memory has a computer program stored thereon, and the processor is configured to invoke and execute the computer program stored in the memory to perform the method according to the above second aspect or any implementation thereof.

In a seventh aspect, a chip is provided. The chip is configured to perform the method according to any of the above first to second aspects or any implementation thereof. In particular, the chip includes a processor configured to invoke and execute a computer program from a memory, to cause a device provided with the chip to perform the method according to any of the above first to second aspects or any implementation thereof.

In an eighth aspect, a computer-readable storage medium is provided. The computer-readable storage medium stores a computer program that causes a computer to perform the method according to any of the above first to second aspects or any implementation thereof.

In a ninth aspect, a computer program product is provided. The computer program product includes computer program instructions that cause a computer to perform the method according to any of the above first to second aspects or any implementation thereof.

In a tenth aspect, a computer program is provided. The computer program, when executed on a computer, causes the computer to perform the method according to any of the above first to second aspects or any implementation thereof.

With the above technical solutions, when the first terminal satisfies the condition for transmitting the trigger signaling, the first terminal transmits the trigger signaling, i.e., to trigger the transmission of the trigger signaling based on the condition. It is possible to support transmission of the trigger signaling in a variety of different situations, so as to avoid unnecessary transmission of assistance information by the second terminal, thereby improving the overall performance of the entire system.

BRIEF DESCRIPTION OF DRAWINGS

FIGS. 8 to 9 are examples of problematic scenarios according to an embodiment of the present disclosure.

FIGS. 10 and 11 are schematic flowcharts each illustrating a wireless communication method according to an embodiment of the present disclosure.

FIG. 12 shows an example of an implementation for transmitting trigger signaling according to an embodiment of the present disclosure.

FIG. 13 is a schematic block diagram of a first terminal according to an embodiment of the present disclosure.

FIG. 14 is a schematic block diagram of a second terminal according to an embodiment of the present disclosure.

DESCRIPTION OF EMBODIMENTS

The technical solutions in the embodiments of the present disclosure will be described below with reference to the figures.

The embodiments of the present disclosure may be applicable to any terminal device-to-terminal device communication framework, e.g., Vehicle to Vehicle (V2V), Vehicle to Everything (V2X), Device to Device (D2D), etc. Here, the terminal device in the embodiment of the present disclosure may be any device or apparatus configured with a physical layer and a media access control layer. The terminal device may also be referred to as an access terminal, e.g., User Equipment (UE), subscriber unit, subscriber station, mobile, mobile station, remote station, remote terminal, mobile device, user terminal, terminal, wireless communication device, user agent, or user device. The access terminal may be a cellular phone, a cordless phone, a Session Initiation Protocol (SIP) phone, a Wireless Local Loop (WLL) station, a Personal Digital Assistant (PDA), a wireless communication-enabled handheld device or computing device, or any other linear processing device connected to a wireless modem, a vehicle mounted device, a wearable device, etc. The embodiments of the present disclosure will be described by taking a vehicle mounted terminal as an example, but is not limited thereto.

FIG. 1 to FIG. 4 show system frameworks for vehicle-mounted terminals to vehicle-mounted terminals according to the embodiments of the present disclosure.

Figure 1:
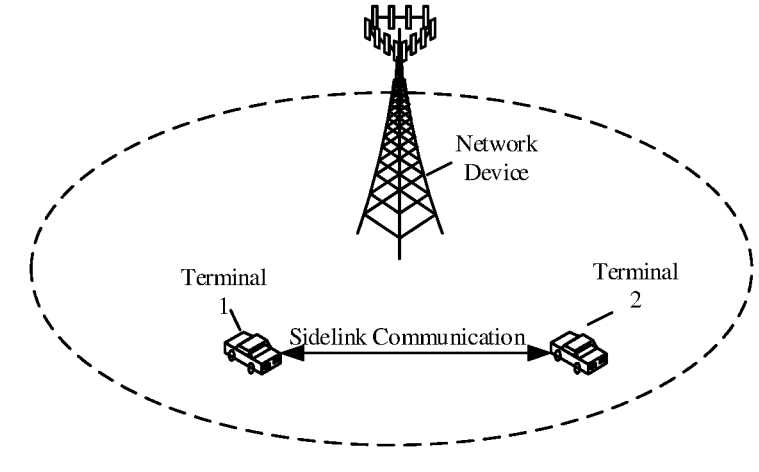
FIGS. 1 to 6 show examples of scenarios according to embodiments of the present disclosure.

As shown in FIG. 1, in the sidelink communication within network coverage, all terminals (including Terminal 1 and Terminal 2) performing sidelink communication are within the coverage of the same network device, such that all terminals can receive configure signaling from the network device and perform sidelink communication based on the same sidelink configuration.

Figure 2:
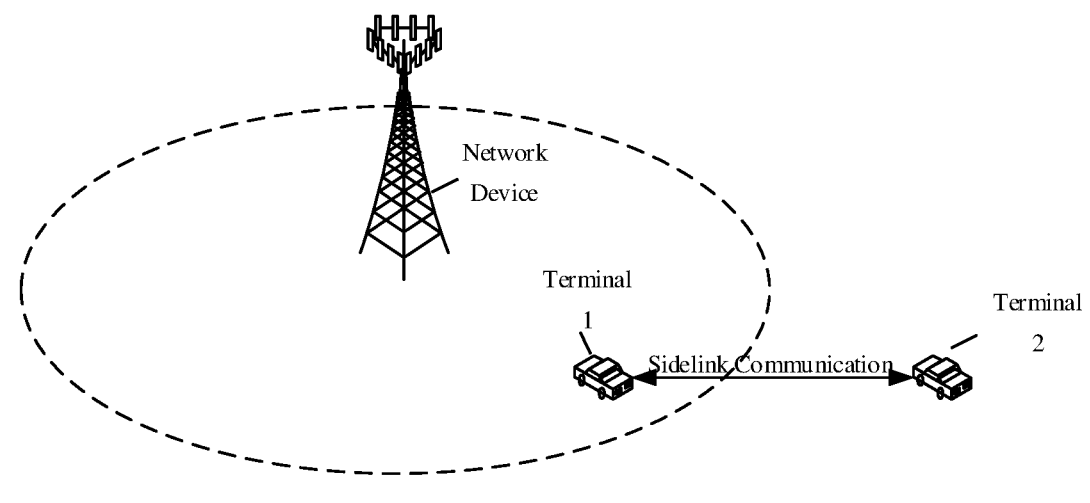

As shown in FIG. 2, in the sidelink communication with partial network coverage, some terminals performing sidelink communication are located within the coverage of the network device, and these terminals (e.g., Terminal 1) can receive configuration signaling from the network device, and perform sidelink communication according to the configuration from the network device. The terminals outside the network coverage (e.g., Terminal 2) cannot receive the configuration signaling from the network device. In this case, the terminals outside the network coverage will determine sidelink configuration according to pre-configuration information and information carried in Sidelink Broadcast Channels (PSBCHs) transmitted by terminals within the network coverage and perform sidelink communication.

Figure 3:

As shown in FIG. 3, for the sidelink communication out of the network coverage, all terminals performing sidelink communication (including Terminal 1 and Terminal 2) are located outside the network coverage, and all terminals determine sidelink configuration according to pre-configuration information and perform sidelink communication.

Device-to-Device communication is a Sidelink (SL) transmission technology based on D2D, which is different from traditional cellular systems where communication data is received or transmitted via network devices and thus has higher spectral efficiency and lower transmission delay. The Internet of Vehicles system adopts D2D direct communication. The 3GPP defines two transmission modes, a first mode and a second mode.

First mode: Transmission resources of a terminal are allocated by a network device, and the terminal transmits data on a sidelink according to the resources allocated by the network device. The network device can allocate resources for a single transmission to the terminal, or allocate semi-static transmission resources for the terminal. As shown in FIG. 1, the terminal is located within the network coverage, and the network allocates transmission resources for sidelink transmission to the terminal.

Second mode: The terminal selects a resource from the resource pool for data transmission. As shown in FIG. 3, the terminal is located outside the coverage area of the cell, and the terminal autonomously selects transmission resources from the preconfigured resource pool for sidelink transmission; or as shown in FIG. 1, the terminal autonomously selects transmission resources for sidelink transmission from a resource pool configured by the network.

The resource selection in the second mode is performed in the following two steps:

Step 1: The terminal takes all available resources in a resource selection window as Resource Set A.

If the terminal transmits data in some time slots in a listening window but does not listen, all resources of these time slots in the corresponding time slots in the selection window are excluded. The terminal uses a value set of a "resource reservation period" field in a resource pool configuration used to determine the corresponding time slots in the selection window.

If the terminal detects a PSCCH within the listening window, it measures RSRP of the PSCCH or RSRP of a PSSCH scheduled by the PSCCH. If the measured RSRP is greater than an SL-RSRP threshold, and the reserved resource determined according to the resource reservation information in sidelink control information transmitted in the PSCCH is within the resource selection window, then the corresponding resource is excluded from Set A. If the remaining resources in Resource Set A are less than X % of all resources in Resource Set A before the resource is excluded, the SL-RSRP threshold is raised by 3 dB and Step 1 is performed again. The possible values of X are {20, 35, 50}, and the terminal determines the parameter X from the value set according to the priority of the data to be transmitted. At the same time, the SL-RSRP threshold is dependent on the priority carried in the PSCCH detected by the terminal and the priority of the data to be transmitted by the terminal. The terminal takes the remaining resources after the resource is excluded in Set A as a candidate resource set.

Step 2: The terminal randomly selects a number of resources from a candidate resource set as transmission resources for its initial transmission and retransmission.

In NR-V2X, autonomous driving needs to be supported, and thus higher requirements, such as higher throughput, lower latency, higher reliability, larger coverage, more flexible resource allocation, are imposed on data interaction between vehicles.

Figure 4:
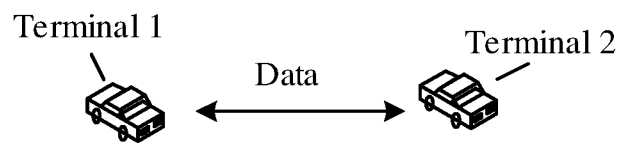
Figure 5:
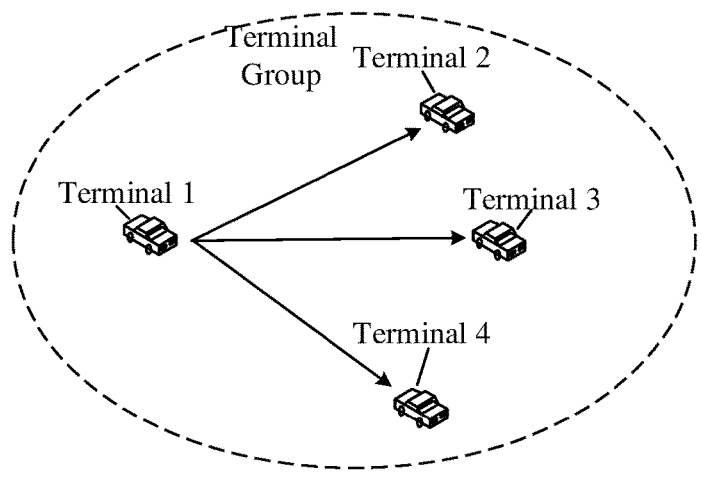
Figure 6:
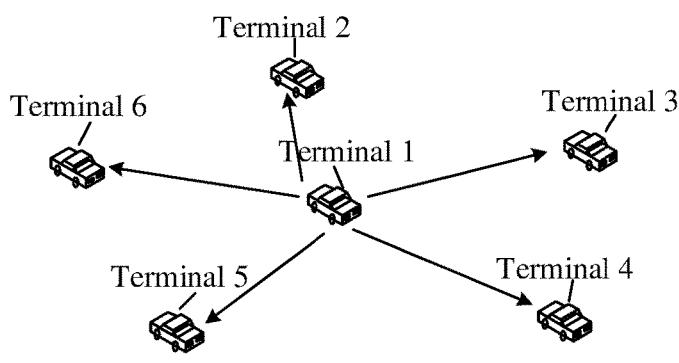

In LTE-V2X, broadcast transmission is supported, and in NR-V2X, unicast and multicast transmission are introduced. For unicast transmission, there is only one terminal at the receiving end. FIG. 4 is a schematic diagram showing unicast transmission according to an embodiment of the present disclosure. As shown in FIG. 4, unicast transmission is performed between Terminal 1 and Terminal 2. For multicast transmission, its receiving end includes all terminals in a communication group, or all terminals within a certain transmission distance. FIG. 5 is a schematic diagram showing multicast transmission according to an embodiment of the present disclosure. As shown in FIG. 5, Terminal 1, Terminal 2, Terminal 3 and Terminal 4 form a communication group, where Terminal 1 transmits data, and other terminal devices in the group are receiving terminals. For broadcast transmission, the receiving end includes any terminal around the transmitting terminal. FIG. 5 is a schematic diagram showing broadcast transmission according to an embodiment of the present disclosure. As shown in FIG. 6, Terminal 1 is a transmitting terminal, and other terminals around it, Terminal 2 to Terminal 6, are all receiving terminals.

Figure 7:
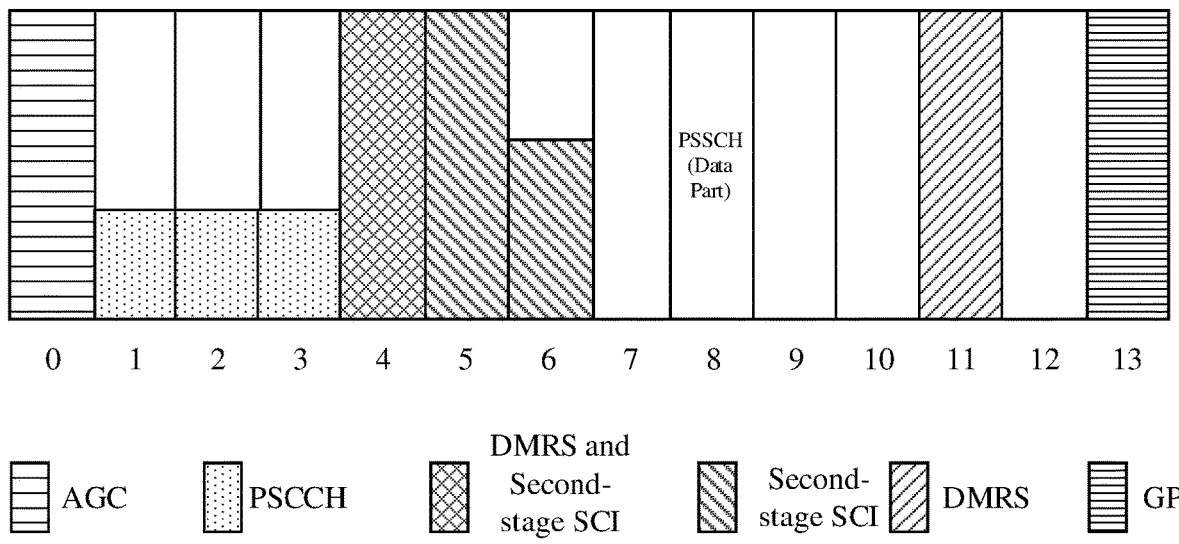
FIG. 7 is a schematic diagram showing frame structures of PSCCH and PSSCH according to an embodiment of the present disclosure.

In NR-V2X, a 2-stage SCI is introduced. The first-stage SCI is carried in a PSCCH to indicate information for a PSSCH such as transmission resources, reserved resource information, MCS level, priority, and the like. The second-stage SCI is transmitted in the resources for the PSSCH, is demodulated using a DMRS for the PSSCH, and indicates information for data demodulation, such as a transmitter ID, a receiver ID, a HARQ ID, and an NDI. The second-stage SCI is mapped from the first DMRS symbol of the PSSCH, first in the frequency domain and then in the time domain. FIG. 7 is a schematic diagram showing frame structures of PSCCH and PSSCH according to an embodiment of the present disclosure. As shown in FIG. 7, the PSCCH occupies 3 symbols (Symbols 1, 2, 3), the DMRS for the PSSCH occupies Symbols 4 and 11, and the second-stage SCI is mapped from Symbol 4, frequency division multiplexed with the DMRS on Symbol 4, and mapped to Symbols 4, 5, and 6, and the resource size occupied by the second-stage SCI depends on the number of bits of the second-stage SCI.

In the transmission method of the above second mode, the terminal randomly selects transmission resources in the resource pool, or selects transmission resources according to the listening result. This resource selection method can avoid interference between terminals to a certain extent, but there are still the following problems:

Hidden node problem: FIG. 8 is a schematic diagram showing a hidden node according to an embodiment of the present disclosure. As shown in FIG. 8, Terminal B selects a resource by listening, and uses the resource to transmit sidelink data to Terminal A. Since Terminal B and Terminal C are far apart, they cannot detect each other's transmissions. Therefore, B and C may select the same transmission resource, the data transmitted by Terminal C will interfere with the data transmitted by Terminal B, resulting in the hidden node problem.

Half-duplex problem: When a terminal selects a transmission resource by listening, in the listening window, if the terminal transmits sidelink data in a certain time slot, due to the half-duplex limitation, the terminal cannot receive data transmitted by other terminals in this time slot. Therefore, when the terminal performs resource exclusion, it will exclude all resources corresponding to the time slot in the selection window to avoid interference with other terminals. Due to the limitation of half-duplex, the terminal may exclude many resources that do not need to be excluded.

Exposed terminal problem: FIG. 9 is a schematic diagram showing a framework with an exposed terminal problem according to an embodiment of the present disclosure. As shown in FIG. 9, both the transmitting Terminal B and the transmitting Terminal C can monitor each other, but the target receiving Terminal A of the transmitting Terminal B is far away from the transmitting terminal C, and the target receiving Terminal D of the Transmitting terminal C is far away from the transmitting Terminal B. In this case, even if the transmitting Terminal B and the transmitting Terminal C use the same time-frequency resource, it will not affect the reception by their respective target receiving terminals. However, due to the close geographical locations of the two terminals, high receiving power of each other's signal may be detected during the listening process, such that they may choose orthogonal time-frequency resources, which may eventually lead to a degradation in resource utilization.

Power consumption problem: In the above listening process, the terminal needs to continuously listen to resources to determine which resources are available. However, such continuous resource listening by the terminal needs to consume a lot of energy. This is not a problem for vehicle-mounted terminals as they have power supply devices, but for handheld terminals, excessive energy consumption will cause the terminals to run out of power quickly. Therefore, how to reduce the energy consumption of the terminal is also a problem that needs to be considered in the resource selection process.

Due to the problems in the resource selection process in the second mode as described above, an enhanced resource selection solution is proposed. On the basis of the resource listening adopted in the second mode, one terminal (second terminal) may transmit a resource set to another terminal (first terminal) to assist the first terminal in resource selection. This resource set can be of any of two different types:

Reference resource set: The second terminal may obtain an available resource set according to a resource listening result, an indication from a network device, etc., and transmit the resource set to the first terminal. The resource set may be a resource set suitable for use by the first terminal. When the first terminal selects a resource for transmitting sidelink data to the target receiving terminal, it may preferentially select the resource from the available resource set, thereby improving the reliability of the target receiving terminal receiving the sidelink data. Alternatively, the resource set may be a resource set not suitable for use by the first terminal, and the first terminal avoids selecting resources in the resource set when selecting resources, thereby avoiding of the above problems associated with hidden nodes, half-duplex limitations, etc.

Allocated transmission resource: The information transmitted by the second terminal to the first terminal includes a transmission resource directly allocated to the first terminal, and the first terminal uses the transmission resource to transmit sidelink data to the target receiving terminal. In this case, it is equivalent to the second terminal allocating the sidelink transmission resource for the first terminal.

Compared with the scheme in which the terminal autonomously selects transmission resources in the second mode, in the above resource allocation scheme, the terminal needs to consider resource sets transmitted by other terminals in the process of resource selection, so as to improve transmission reliability. In the above enhanced resource selection scheme, in the second mode, the terminal autonomously selects transmission resources. During the resource selection process, the terminal can also consider resource sets transmitted by other terminals, so as to improve transmission reliability.

However, there is no further specific solution in the related art regarding how the terminal can obtain the resource sets transmitted by other terminal devices. For example, in some cases, the second terminal needs to transmit the resource set according to trigger signaling transmitted by the first terminal, but what resource is to be used for transmitting the above trigger signaling is a problem to be solved.

The embodiment of the present disclosure provides a method for transmitting trigger signaling. According to the method proposed in the present disclosure, a first terminal first determines whether a condition for transmitting the trigger signaling is satisfied. Then, if the first terminal has a sidelink grant, the first terminal can use a resource in the sidelink grant to transmit the trigger signaling when the condition is satisfied. If the first terminal has no sidelink grant, the first terminal can randomly select a resource in an exceptional resource pool for transmitting the trigger signaling when the condition is satisfied. Alternatively, the first terminal may first perform resource selection when the condition is satisfied, and then use the resource selected for transmitting a first TB to transmit the trigger signaling. After transmitting the trigger signaling, the first terminal can receive a resource set fed back by a second terminal, and then perform corresponding operations according to the content in the resource set. The method proposed in the present disclosure can support transmitting the trigger signaling in a variety of different situations, such that the second terminal can feed back assistance information according to the instruction from the first terminal, so as to avoid unnecessary transmission of assistance information by the second terminal, and eventually improve the overall performance of the entire system.

In addition, an embodiment of the present disclosure refines the resource set transmitted by the second terminal to the first terminal, specifically in the following four cases:

Case 1: Time-frequency resources within a certain time range in the future, for example, time-frequency resources located within a time range [A, B].

Case 2: Resources that have been reserved by the first terminal via signaling, for example, resources reserved by the first terminal via PSCCH for retransmission of the same TB, or resources for new transmission or retransmission of other new TBs.

Case 3: Resources pre-selected by the first terminal but not yet reserved via signaling. The number of retransmissions of one TB may be up to 32, and if the first terminal supports periodic resource reservation, the first terminal can reserve up to 150 periodic resources. However, the first terminal can only reserve at most two resources for retransmission of the same TB and for transmission of a new TB in the next period in one signaling.

Case 4: Resources that have been used by the first terminal, for example, resources used by the first terminal in a past period of time.

In the above four cases, the second terminal may transmit the resource set to the first terminal within a certain time range [t_a, t_b] after receiving the trigger signaling transmitted by the first terminal. In the present disclosure, the first terminal may transmit the trigger signaling in a specific bit field in a PSCCH, or via a MAC Control Element (MAC CE) carried in a PSSCH, second-stage SCI, or PC5 RRC.

The wireless communication methods according to the embodiments of the present disclosure will be described below with reference to FIG. 10 and FIG. 11.

FIG. 10 is a schematic interaction diagram of a wireless communication method 100 according to an embodiment of the present disclosure. The method 100 may be performed interactively by the first terminal and the second terminal. The first terminal may be a transmitter that is about to transmit data, and the second terminal may be a terminal that is about to receive data or a terminal around the first terminal. For example, the first terminal may be Terminal B described above, and the first terminal may be Terminal A described above.

As shown in FIG. 10, the method 100 may include some or all of the following content.

At S110, a first terminal determines whether the first terminal satisfies a condition for transmitting trigger signaling. The trigger signaling instructs a second terminal to transmit assistance information for assisting the first terminal in resource selection.

At S120, the first terminal transmits the trigger signaling when the first terminal satisfies the condition for transmitting the trigger signaling.

In this embodiment of the present disclosure, when the first terminal satisfies the condition for transmitting the trigger signaling, the first terminal transmits the trigger signaling, i.e., to trigger the transmission of the trigger signaling based on the condition. It is possible to support transmission of the trigger signaling in a variety of different situations, so as to avoid unnecessary transmission of assistance information by the second terminal, thereby improving the overall performance of the entire system.

It should be noted that the assistance information in the embodiment of the present disclosure may be any one of the four cases described above, and of course, may alternatively be defined in other ways and the embodiment of the present disclosure is not limited to this. The assistance information in the embodiment of the present disclosure is intended to assist the first terminal device in resource selection, for example, to assist the first terminal to select resources so as to avoid the above hidden problems in the second mode and avoid waste of resources.

In some embodiments of the present disclosure, the satisfying of the condition for the transmitting the trigger signaling may include at least one of:

the first terminal having triggered resource reselection, the first terminal being to perform resource reselection, a priority of sidelink data to be transmitted by the first terminal satisfying the condition for transmitting the trigger signaling, a state of the first terminal receiving Acknowledgement (ACK) or Non-Acknowledgement (NACK) fed back from the second terminal satisfying the condition for transmitting the trigger signaling, or a delay requirement of the sidelink data to be transmitted by the first terminal satisfying the condition for transmitting the trigger signaling.

Optionally, the first terminal being to perform resource reselection may include at least one of:

when a sidelink process of the first terminal is used for transmitting a plurality of Medium Access Control (MAC) Protocol Data Units (PDUs), a resource occupation counter SL_RESOURCE_RESELECTION-_COUNTER is equal to 1, and a value of a random number randomly generated by the first terminal in [0, 1] is greater than a parameter sl-ProbResourceKeep configured by a higher layer, the first terminal being to perform resource reselection after transmission of a next MAC PDU or after the SL_RESOURCE_RESE-LECTION_COUNTER becomes zero;

when the sidelink process of the first terminal is used for transmitting the plurality of MAC PDUs, and the first terminal has not used any reserved resource for initial transmission or retransmission within a past predetermined time period, the first terminal being to perform resource reselection when there is sidelink data in a logical channel of the first terminal, the predetermined time period being one second, or other value, which is not limited in the present disclosure;

when the sidelink process of the first terminal is used for transmitting the plurality of MAC PDUs, and the first terminal has not transmitted any information on sl-ReselectAfter consecutive reserved resources, the first terminal being to perform resource reselection when there is sidelink data in a logical channel of the first terminal, where sl-ReselectAfter is a parameter configured by a higher layer; or when the first terminal has a sidelink granted resource, but even if the first terminal adopts a maximum Modulation and Coding Scheme (MCS) allowed by a higher layer, the sidelink granted resource cannot bear a Radio Link Control (RLC) PDU and a MAC layer of the first terminal does not segment the RLC PDU, the first terminal being to perform resource reselection.

Optionally, the priority of the sidelink data to be transmitted by the first terminal satisfying the condition for transmitting the trigger signaling may include: the priority of the sidelink data to be transmitted by the first terminal being higher than a first threshold. Optionally, the first threshold may be configured by a network device, preconfigured, or predefined.

It should be noted that, in the embodiments of the present disclosure, the "predefined" may implemented as pre-stored in one or more devices (for example, including a terminal device and a network device) corresponding codes, tables or other means that can be used to indicate related information, and the present disclosure is not limited to the specific implementation. For example, "predefined" may refer to defined in protocols. Optionally, the "protocols" may refer to standard protocols in the communication field, including e.g., the LTE protocol, the NR protocol, and related protocols applied in future communication systems (the present disclosure is not limited to any of these examples). Of course, the same also applies to the term "predefined" as used in the second threshold to the seventh threshold below, and details thereof will be omitted for simplicity.

Optionally, the state of the first terminal receiving ACK or NACK fed back from the second terminal satisfying the condition for transmitting the trigger signaling may include at least one of:

if a receiver corresponding to the first terminal feeds back an ACK in response to successfully receiving a Physical Sidelink Shared Channel (PSSCH) transmitted by the first terminal, and feeds back an NACK in response to successfully receiving a Physical Sidelink Control Channel (PSCCH) transmitted by the first terminal but failing to receive the PSSCH transmitted by the first terminal, when a number of times the first terminal fails to receive ACK from the receiver successively is greater than a second threshold, the first terminal being to perform resource reselection (optionally, the second threshold may be configured by a network device, preconfigured, or predefined); or if the receiver feeds back an NACK in response to successfully receiving the PSCCH transmitted by the first terminal but failing to receive the PSSCH transmitted by the first terminal, and does not provide any feedback otherwise, when a number of times the first terminal receives NACK from the receiver successively is greater a third threshold, the first terminal being to perform resource reselection (optionally, the third threshold may be configured by a network device, preconfigured, or predefined).

Optionally, the delay requirement of the sidelink data to be transmitted by the first terminal satisfying the condition for transmitting the trigger signaling may include: the delay requirement of the sidelink data to be transmitted by the first terminal being greater than a fourth threshold. Optionally, the fourth threshold may be configured by a network device, preconfigured, or predefined.

In some embodiments of the present disclosure, S120 may include:

transmitting, by the first terminal, the trigger signaling over a resource in a sidelink grant.

Optionally, when the first terminal has the sidelink grant, the first terminal may transmit the trigger signaling over the resource in the sidelink grant. Optionally, when the first terminal has the sidelink grant and the first terminal determines that the resource reselection is to be performed in time slot n, the first terminal may determine the resource in the sidelink grant as a resource for transmitting the trigger signaling, where n is a non-negative integer. Optionally, the resource in the sidelink grant may be determined based on a condition satisfied by the first terminal.

The implementation of determining the resource in the sidelink grant based on the condition satisfied by the first terminal will be exemplarily described below.

Scheme 1:

The condition satisfied by the first terminal may include:

a sidelink process of the first terminal is used for transmitting a plurality of MAC PDUs, a value of a resource occupation counter SL_RESOURCE_RESELEC-TION_COUNTER is equal to 1, and a value of a random number randomly generated by the first terminal in [0, 1] is greater than a parameter sl-ProbRe-sourceKeep configured by a higher layer, the first terminal being to perform resource reselection after transmission of a next MAC PDU or after the SL_RE-SOURCE_RESELECTION_COUNTER becomes zero.

S120 may include:

transmitting, by the first terminal, the trigger signaling during the transmission of the next MAC PDU.

Optionally, when a number of transmissions of the next MAC PDU is greater than one, the first terminal may include the trigger signaling in each transmission of the MAC PDU.

Optionally, the first terminal may further satisfy at least one of the following conditions:

the priority of the sidelink data to be transmitted by the first terminal being higher than a first threshold;

if a receiver corresponding to the first terminal feeds back an ACK in response to successfully receiving a Physical Sidelink Shared Channel (PSSCH) transmitted by the first terminal, and feeds back an NACK in response to successfully receiving a Physical Sidelink Control Channel (PSCCH) transmitted by the first terminal but failing to receive the PSSCH transmitted by the first terminal, when a number of times the first terminal fails to receive ACK from the receiver successively is greater than a second threshold, the first terminal being to perform resource reselection;

if the receiver feeds back an NACK in response to successfully receiving the PSCCH transmitted by the first terminal but failing to receive the PSSCH transmitted by the first terminal, and does not provide any feedback otherwise, when a number of times the first terminal receives NACK from the receiver successively is greater a third threshold, the first terminal being to perform resource reselection;

the delay requirement of the sidelink data to be transmitted by the first terminal being greater than a fourth threshold; or a time interval between a start of a resource selection window in the resource reselection to be performed by the first terminal and a first transmission resource of the next MAC PDU being greater than a fifth threshold (optionally, the fifth threshold may be configured by a network device, preconfigured, or predefined).

Scheme 2:

The condition satisfied by the first terminal may include at least one of:

when the sidelink process of the first terminal is used for transmitting the plurality of MAC PDUs, and the first terminal has not used any reserved resource for initial transmission or retransmission within a past predetermined time period, the first terminal being to perform resource reselection when there is sidelink data in a logical channel of the first terminal; or when the sidelink process of the first terminal is used for transmitting the plurality of MAC PDUs, and the first terminal has not transmitted any information on sl-ReselectAfter consecutive reserved resources, the first terminal being to perform resource reselection when there is sidelink data in a logical channel of the first terminal, where sl-ReselectAfter is a parameter configured by a higher layer.

S120 may include:

transmitting, by the first terminal when there is sidelink data in a logical channel of the first terminal and the resource reselection is required, the trigger signaling over last N reserved resources before the resource reselection, where N is non-negative integer (optionally, a value of N may be configured by a network device, or preconfigured, or predefined).

Optionally, the trigger signaling may be transmitted via a MAC CE in a PSSCH, or via second-stage Sidelink Control Information (SCI).

Optionally, the condition satisfied by the first terminal may further include at least one of:

the priority of the sidelink data to be transmitted by the first terminal being higher than a first threshold;

if a receiver corresponding to the first terminal feeds back an ACK in response to successfully receiving a Physical Sidelink Shared Channel (PSSCH) transmitted by the first terminal, and feeds back an NACK in response to successfully receiving a Physical Sidelink Control Channel (PSCCH) transmitted by the first terminal but failing to receive the PSSCH transmitted by the first terminal, when a number of times the first terminal fails to receive ACK from the receiver successively is greater than a second threshold, the first terminal being to perform resource reselection;

if the receiver feeds back an NACK in response to successfully receiving the PSCCH transmitted by the first terminal but failing to receive the PSSCH transmitted by the first terminal, and does not provide any feedback otherwise, when a number of times the first terminal receives NACK from the receiver successively is greater a third threshold, the first terminal being to perform resource reselection;

the delay requirement of the sidelink data to be transmitted by the first terminal being greater than a fourth threshold; or a time interval between a start of a resource selection window in the resource reselection to be performed by the first terminal and a first transmission resource of the N reserved resources being greater than a sixth threshold (optionally, the sixth threshold may be configured by a network device, or preconfigured, or predefined).

Scheme 3:

The condition satisfied by the first terminal may include when the first terminal has a sidelink granted resource, but even if the first terminal adopts a maximum Modulation and Coding Scheme (MCS) allowed by a higher layer, the sidelink granted resource cannot bear a Radio Link Control (RLC) PDU and a MAC layer of the first terminal does not segment the RLC PDU, the first terminal being to perform resource reselection.

S120 may include:

transmitting, by the first terminal, the trigger signaling over the resource that cannot bear the RLC PDU.

Optionally, the trigger signaling may be transmitted via a MAC CE in a PSSCH, or via second-stage Sidelink Control Information (SCI).

Optionally, the condition satisfied by the first terminal may further include at least one of:

the priority of the sidelink data to be transmitted by the first terminal being higher than a first threshold;

if a receiver corresponding to the first terminal feeds back an ACK in response to successfully receiving a Physical Sidelink Shared Channel (PSSCH) transmitted by the first terminal, and feeds back an NACK in response to successfully receiving a Physical Sidelink Control Channel (PSCCH) transmitted by the first terminal but failing to receive the PSSCH transmitted by the first terminal, when a number of times the first terminal fails to receive ACK from the receiver successively is greater than a second threshold, the first terminal being to perform resource reselection;

if the receiver feeds back an NACK in response to successfully receiving the PSCCH transmitted by the first terminal but failing to receive the PSSCH transmitted by the first terminal, and does not provide any feedback otherwise, when a number of times the first terminal receives NACK from the receiver successively is greater a third threshold, the first terminal being to perform resource reselection;

the delay requirement of the sidelink data to be transmitted by the first terminal being greater than a fourth threshold; or a time interval between a start of a resource selection window in the resource reselection to be performed by the first terminal and the resource that cannot bear the RLC PDU being greater than a seventh threshold (optionally, the seventh threshold may be configured by a network device, preconfigured, or predefined).

In some embodiments of the present disclosure, S120 may include:

transmitting, by the first terminal, the trigger signaling over a randomly selected resource.

Optionally, when the first terminal has no sidelink grant, the first terminal may transmit the trigger signaling over a randomly selected resource.

Optionally, the randomly selected resource may be determined by a condition satisfied by the first terminal.

The implementation of determining the randomly selected resource based on the condition satisfied by the first terminal will be exemplarily described below.

Scheme 1:

The first terminal may satisfy at least one of the following conditions:

the first terminal having triggered the resource reselection, and the priority of the sidelink data to be transmitted by the first terminal being higher than a first threshold; or the first terminal having triggered the resource reselection, and if a receiver corresponding to the first terminal feeds back an ACK in response to successfully receiving a Physical Sidelink Shared Channel (PSSCH) transmitted by the first terminal, and feeds back an NACK in response to successfully receiving a Physical Sidelink Control Channel (PSCCH) transmitted by the first terminal but failing to receive the PSSCH transmitted by the first terminal, when a number of times the first terminal fails to receive ACK from the receiver successively is greater than a second threshold, the first terminal being to perform resource reselection.

S120 may include:

selecting, by the first terminal when the first terminal is configured with an exceptional resource pool, the resource randomly in the exceptional resource pool; and transmitting, by the first terminal, the trigger signaling over the randomly selected resource.

Optionally, the trigger signaling may be transmitted via a MAC CE in a PSSCH, or via second-stage Sidelink Control Information (SCI).

Optionally, the condition satisfied by the first terminal may further include:

the delay requirement of the sidelink data to be transmitted by the first terminal being greater than a fourth threshold.

Scheme 2:

In this embodiment, the first terminal may satisfy at least one of the following conditions:

if a receiver corresponding to the first terminal feeds back an ACK in response to successfully receiving a Physical Sidelink Shared Channel (PSSCH) transmitted by the first terminal, and feeds back an NACK in response to successfully receiving a Physical Sidelink Control Channel (PSCCH) transmitted by the first terminal but failing to receive the PSSCH transmitted by the first terminal, when a number of times the first terminal fails to receive ACK from the receiver successively is greater than a second threshold, the first terminal being to perform resource reselection; or if the receiver feeds back an NACK in response to successfully receiving the PSCCH transmitted by the first terminal but failing to receive the PSSCH transmitted by the first terminal, and does not provide any feedback otherwise, when a number of times the first terminal receives NACK from the receiver successively is greater a third threshold, the first terminal being to perform resource reselection.

S120 may include:

selecting, by the first terminal when the first terminal is configured with an exceptional resource pool, the resource randomly in the exceptional resource pool for transmitting the triggering signaling.

Optionally, the trigger signaling may be transmitted via a MAC CE in a PSSCH, or via second-stage Sidelink Control Information (SCI).

In the present disclosure, the resource selection can be performed at a MAC layer or a physical layer of the terminal device.

In some embodiments of the present disclosure, the random selection may be performed at a MAC layer of the first terminal, and the MAC layer of the first terminal may select the resource for transmitting the trigger signaling within [TM1, TM2].

Optionally, a value of TM1 may be autonomously selected by the first terminal or TM1<=n+Tproc, where n represents time at which the first terminal triggers the resource selection, and Tproc represents maximum processing time required by the first terminal from triggering of the resource selection to transmitting of the trigger signaling and has a value that is configured by a network device, preconfigured, or predefined. A value of TM2 may be autonomously selected by the first terminal or TM2<=X %×PDB, where PDB is a delay requirement of the sidelink data to be transmitted by the first terminal, and X has a value that is configured by a network device, preconfigured, or predefined.

In some embodiments of the present disclosure, the random selection may be performed at a physical layer of the first terminal, and a MAC layer of the first terminal provides the physical layer with a configuration of an exceptional resource pool such that the physical layer selects the resource for transmitting the trigger signaling within [TP1, TP2].

Optionally, a value of TP1 may be autonomously selected by the first terminal or TP1<=n+Tproc, where n represents time at which the first terminal triggers the resource selection, and Tproc represents maximum processing time required by the first terminal from triggering of the resource selection to transmitting of the trigger signaling and has a value that is configured by a network device, preconfigured, or predefined. A value of TP2 may be determined based on an upper limit reference value of a selection window in the configuration of the exceptional resource pool, and the upper limit reference value of the selection window indicates a transmission delay requirement of the trigger signaling indicated by the MAC layer of the first terminal.

Optionally, the upper limit reference value of the selection window is PDB, and TP2<=X %×PDB, where PDB is a delay requirement of the sidelink data to be transmitted by the first terminal, and X has a value that is configured by a network device, preconfigured, or predefined, or the physical layer selects within [TP2_min, the upper limit reference value of the selection window], where TP2_min has a value that is configured by a network device, preconfigured, or predefined.

In some embodiments of the present disclosure, the trigger signaling may include at least one of:

a transmission resource pool of the first terminal, a priority prio_TX of sidelink data to be transmitted by the first terminal, a start and an end of a resource selection window in resource selection to be performed by the first terminal, a delay requirement of the sidelink data to be transmitted by the terminal, a frequency domain resource size L_subCH used in the resource selection to be performed by the first terminal, or a resource reservation period P_rsvp_TX used in the resource selection to be performed by the first terminal.

Optionally, the method 100 may further include:

receiving, by the first terminal, the assistance information, the assistance information including a resource suitable for transmission by the first terminal and/or a resource not suitable for the first terminal in the resource pool indicated by the first terminal; and selecting, by the first terminal when the assistance information includes the resource suitable for transmission by the first terminal, the resource suitable for transmission by the first terminal preferentially in the resource selection, or excluding, by the first terminal when the assistance information includes the resource not suitable for transmission by the first terminal, the resource not suitable for transmission by the first terminal preferentially in the resource selection.

In other words, when the first terminal device transmits the trigger signaling over a sidelink grant resource or a randomly selected resource, the trigger signaling may include at least one of: a transmission resource pool of the first terminal, a priority prio_TX of sidelink data to be transmitted by the first terminal, a start and an end of a resource selection window in resource selection to be performed by the first terminal, a delay requirement of the sidelink data to be transmitted by the terminal, a frequency domain resource size L_subCH used in the resource selection to be performed by the first terminal, or a resource reservation period P_rsvp_TX used in the resource selection to be performed by the first terminal. The assistance information may include a resource suitable for transmission by the first terminal and/or a resource not suitable for the first terminal in the resource pool indicated by the first terminal. Based on this, when the assistance information includes the resource suitable for transmission by the first terminal, the first terminal may select the resource suitable for transmission by the first terminal preferentially in the resource selection, or when the assistance information includes the resource not suitable for transmission by the first terminal, the first terminal may exclude the resource not suitable for transmission by the first terminal preferentially in the resource selection.

In some embodiments of the present disclosure, S120 may include:

transmitting, by the first terminal, the trigger signaling on a first resource selected in resource reselection.

Optionally, the trigger signaling may be transmitted using first W resources selected by the first terminal in the resource reselection, where W>=1.

Optionally, a value of W may be configured by a network device, preconfigured, or predefined.

In some embodiments of the present disclosure, the first terminal may transmit the trigger signaling on one or more PSSCH resources used for transmitting a first transport block after the resource reselection.

Optionally, the trigger signaling may be transmitted via a MAC CE in a PSSCH, or via second-stage Sidelink Control Information (SCI).

Optionally, the trigger signaling may include at least one of:

a transmission resource pool of the first terminal, or M resources selected by the first terminal, where a value of M is smaller than or equal to a number of resources that have been selected by the first terminal (optionally, the M resources selected by the first terminal may include all resources that have been selected by the first terminal and have not been indicated by the PSCCH).

Optionally, the method 100 may further include:

receiving, by the first terminal, the assistance information, the assistance information including a resource not suitable for the first terminal among the M resources; and excluding, by the first terminal, the resource not suitable for transmission by the first terminal preferentially in the resource selection.

In some embodiments of the present disclosure, the first terminal may transmit the trigger signaling on one or more PSSCH resources used for transmitting a first transport block after the resource reselection.

Optionally, the trigger signaling may be indicated by a reserved bit in PSCCH format 1-A.

Optionally, the method 100 may further include:

receiving, by the first terminal, the assistance information, the assistance information including a resource not suitable for the first terminal among one or two resources indicated by the reserved bit in the PSCCH format 1-A; and excluding, by the first terminal, the resource not suitable for transmission by the first terminal preferentially in the resource selection.

In order to facilitate understanding of the solution of the present disclosure, the wireless communication method according to the embodiment of the present disclosure will be described below with reference to FIG. 11.

FIG. 11 is a schematic flowchart illustrating a wireless communication method 200 according to an embodiment of the present disclosure. The method 200 can be performed by a first terminal.

As shown in FIG. 11, the method 200 may include some or all of the following:

At S210, the method starts. The first terminal is triggered to perform S220 at "Start".

At S220, the first terminal determines whether a trigger condition is satisfied, and the trigger condition may be the above condition for transmitting the trigger signaling.

In this embodiment, for the purpose of description, the trigger condition will be labeled as the following 9 conditions:

Condition 1:

The first terminal has triggered resource reselection.

Condition 2:

When a sidelink process of the first terminal is used for transmitting a plurality of MAC PDUs, a resource occupation counter SL_RESOURCE_RESELECTION-_COUNTER is equal to 1, and a value of a random number randomly generated by the first terminal in [0, 1] is greater than a parameter sl-ProbResourceKeep configured by a higher layer, the first terminal is to perform resource reselection after transmission of a next MAC PDU or after the SL_RESOURCE_RESELECTION_COUNTER becomes zero.

Condition 3:

When the sidelink process of the first terminal is used for transmitting the plurality of MAC PDUs, and the first terminal has not used any reserved resource for initial transmission or retransmission within the past one second, the first terminal is to perform resource reselection when there is sidelink data in a logical channel of the first terminal.

Condition 4:

When the sidelink process of the first terminal is used for transmitting the plurality of MAC PDUs, and the first terminal has not transmitted any information on sl-Reselect-After consecutive reserved resources, the first terminal is to perform resource reselection when there is sidelink data in a logical channel of the first terminal, where sl-ReselectAfter is a parameter configured by a higher layer.

Condition 5:

When the first terminal has a sidelink granted resource, but even if the first terminal adopts a maximum MCS allowed by a higher layer, the sidelink granted resource cannot bear an RLC PDU and a MAC layer of the first terminal does not segment the RLC PDU, the first terminal is to perform resource reselection.

Condition 6:

The priority of the sidelink data to be transmitted by the first terminal is higher than a certain threshold, which is configured by a network, pre-configured, or defined in a standard.

Condition 7:

If a receiver corresponding to the first terminal feeds back an ACK in response to successfully receiving a PSSCH transmitted by the first terminal, and feeds back an NACK in response to successfully receiving a PSCCH transmitted by the first terminal but failing to receive the PSSCH transmitted by the first terminal, a number of times the first terminal fails to receive ACK from the receiver successively is greater than a certain threshold, which is configured by a network, pre-configured, or defined in a standard.

Condition 8:

If the receiver feeds back an NACK in response to successfully receiving the PSCCH transmitted by the first terminal but failing to receive the PSSCH transmitted by the first terminal, and does not provide any feedback otherwise, a number of times the first terminal receives NACK from the receiver successively is greater a certain threshold, which is configured by a network, pre-configured, or defined in a standard.

Condition 9:

The delay requirement of the sidelink data to be transmitted by the first terminal is greater than a certain threshold, which is configured by a network, pre-configured, or defined in a standard.

In short, the first terminal device satisfying the condition for transmitting the trigger signaling may refer to the first terminal satisfying any one of the above Conditions 1 to 9.

At S230, the first terminal transmits the trigger signaling.

Specifically, when the trigger condition is satisfied, the first terminal transmits the trigger signaling, and when the trigger condition is not satisfied, the method 200 is restarted.

Specifically, when the condition for transmitting the trigger signaling is satisfied, the first terminal uses a resource in an existing sidelink grant, a resource randomly selected by the first terminal, or a first resource selected by the first terminal after triggering resource reselection, to transmit the trigger signaling. The implementation of transmitting the trigger signaling by the first terminal will be described below in combination with specific embodiments.

Embodiment 1: In this embodiment, the first terminal transmits the trigger signaling over the resource in the existing sidelink grant.

In this embodiment, when the first terminal has a sidelink grant, and the first terminal can determine to perform resource reselection in time slot n in the future, the first terminal can transmit the trigger signaling over the resource in the existing sidelink grant.

For example, if the first terminal satisfies at least the above Condition 2, the first terminal can determine that the resource reselection will be performed after transmission of the next MAC PDU is completed. In this case, the first terminal can transmit the trigger signaling during the transmission of the next MAC PDU. Preferably, if the number of transmissions of the next MAC PDU is greater than 1, the first terminal should include the trigger signaling in each transmission of the MAC PDU. In this case, the trigger signaling may be transmitted via a MAC Control Element (MAC CE) in the PSSCH carrying the next MAC PDU, or via second-stage SCI that schedules the next MAC PDU. Preferably, the trigger signaling should include at least one of the transmission resource pool of the first terminal, a priority prio_TX of the sidelink data to be transmitted by the first terminal, a start and an end of a resource selection window in resource selection to be performed by the first terminal, a delay requirement of the data to be transmitted by the terminal, a frequency domain resource size L_subCH used in the resource selection to be performed by the first terminal, or a resource reservation period P_rsvp_TX used in the resource selection to be performed by the first terminal.

Optionally, when the above Condition 2 is satisfied, the first terminal can transmit the trigger signaling only when at least one of the following two conditions is also satisfied: Condition 6, Condition 7, Condition 8, Condition 9, or a time interval between a start of a resource selection window in the resource reselection to be performed by the first terminal and a first transmission resource of the MAC PDU being greater than a certain threshold.

FIG. 12 shows an example of an implementation of transmitting trigger signaling according to an embodiment of the present disclosure.

As shown in FIG. 12, the last resource of the first terminal before the resource occupation counter becomes zero may be used to transmit the trigger signaling. For example, the last resource of the first terminal for new transmission before the resource occupation counter becomes zero may be used to transmit the trigger signaling, or the last resource of the first terminal for retransmission before the resource occupation counter becomes zero may be used to transmit the trigger signaling.

In another example, if the first terminal satisfies at least the above Conditions 3 or 4, when there is sidelink data in a logical channel of the first terminal and the resource reselection is required, the first terminal uses the last N reserved resources before the resource reselection to transmit the trigger signaling, where a value of N may be configured by the network, preconfigured, or defined in a standard. In this case, the trigger signaling may be transmitted via a MAC Control Element (MAC CE) in a PSSCH, or via second-stage SCI. Preferably, the trigger signaling should include at least one of: a transmission resource pool of the first terminal, a priority prio_TX of sidelink data to be transmitted by the first terminal, a start and an end of a resource selection window in resource selection to be performed by the first terminal, a delay requirement of the data to be transmitted by the terminal, a frequency domain resource size L_subCH used in the resource selection to be performed by the first terminal, or a resource reservation period P_rsvp_TX used in the resource selection to be performed by the first terminal.

Optionally, when the above Condition 3 or 4 is satisfied, the first terminal can transmit the trigger signaling only when at least one of the following two conditions is also satisfied: Condition 6, Condition 7, Condition 8, Condition 9, or a time interval between a start of a resource selection window in the resource reselection to be performed by the first terminal and a first transmission resource of the N reserved resources being greater than a certain threshold.

In another example, if the first terminal satisfies at least the above Condition 5, the first terminal transmits the trigger signaling using a resource that cannot bear the RLC PDU. In this case, the trigger signaling may be transmitted via a MAC Control Element (MAC CE) in a PSSCH, or via second-stage SCI. Preferably, the trigger signaling should include at least one of: a transmission resource pool of the first terminal, a priority prio_TX of sidelink data to be transmitted by the first terminal, a start and an end of a resource selection window in resource selection to be performed by the first terminal, a delay requirement of the data to be transmitted by the terminal, a frequency domain resource size L_subCH used in the resource selection to be performed by the first terminal, or a resource reservation period P_rsvp_TX used in the resource selection to be performed by the first terminal.

Optionally, when the above Condition 5 is satisfied, the first terminal can transmit the trigger signaling only when at least one of the following two conditions is also satisfied: Condition 6, Condition 7, Condition 8, Condition 9, or a time interval between a start of a resource selection window in the resource reselection to be performed by the first terminal and the resource that cannot bear the RLC PDU being greater than a certain threshold.

Embodiment 2: In this embodiment, the first terminal transmits the trigger signaling over a randomly selected resource.

In this embodiment, when the first terminal triggers resource reselection, there is no sidelink granted resource, and the first terminal selects the resource for transmitting the trigger signaling by means of random selection.

For example, when the first terminal satisfies Condition 1 and Condition 6, or when the first terminal satisfies Condition 1 and Condition 7, if the first terminal is currently configured with an exceptional resource pool, the first terminal can select a resource randomly from the exceptional resource pool for transmitting the triggering signaling. In this case, the trigger signaling may be transmitted via a MAC Control Element (MAC CE) in a PSSCH, or via second-stage SCI. Preferably, the trigger signaling should include at least one of: a transmission resource pool of the first terminal, a priority prio_TX of sidelink data to be transmitted by the first terminal, a start and an end of a resource selection window in resource selection to be performed by the first terminal, a delay requirement of the data to be transmitted by the terminal, a frequency domain resource size L_subCH used in the resource selection to be performed by the first terminal, or a resource reservation period P_rsvp_TX used in the resource selection to be performed by the first terminal.

Optionally, when the first terminal satisfies Condition 1 and Condition 6, or when the first terminal satisfies Condition 1 and Condition 7, or when the first terminal satisfies Condition 1 and Condition 8, the first terminal can transmit the trigger signaling only when Condition 9 is also satisfied.

In another example, when the first terminal satisfies Condition 7 or Condition 8, the first terminal triggers the resource reselection. The first terminal may select a resource randomly from the exceptional resource pool for transmitting the triggering signaling. In this case, the trigger signaling may be transmitted via a MAC Control Element (MAC CE) in a PSSCH, or via second-stage SCI. Preferably, the trigger signaling should include at least one of: a transmission resource pool of the first terminal, a priority prio_TX of sidelink data to be transmitted by the first terminal, a start and an end of a resource selection window in resource selection to be performed by the first terminal, a delay requirement of the data to be transmitted by the terminal, a frequency domain resource size L_subCH used in the resource selection to be performed by the first terminal, or a resource reservation period P_rsvp_TX used in the resource selection to be performed by the first terminal.

For the above Embodiment 1 and Embodiment 2, if the random selection is performed at the MAC layer of the first terminal, the MAC layer of the first terminal should select the resource for transmitting the trigger signaling within [TM1, TM2]. Here, a value of TM1 is autonomously selected by the first terminal or TM1<=n+Tproc, where n represents time at which the first terminal triggers the resource selection, and Tproc represents maximum processing time required by the first terminal from triggering of the resource selection to transmitting of the trigger signaling and has a value that is configured by the network, preconfigured, or defined in a standard. A value of TM2 is autonomously selected by the first terminal or TM2<=X %×PDB, where PDB is a delay requirement of the data to be transmitted by the first terminal, and X has a value that is configured by the network, preconfigured, or defined in a standard.

If the random selection is performed at the physical layer of the first terminal, the MAC layer of the first terminal should provide the physical layer with a configuration of an exceptional resource pool, an upper limit reference value of a selection window, a frequency domain resource size required for transmitting the trigger signaling, etc. The physical layer of the first terminal shall select the resources for transmitting the trigger signaling within [TP1, TP2]. Here, a value of TP1 is autonomously selected by the first terminal or TP1<=n+Tproc, where n represents time at which the first terminal triggers the resource selection, and Tproc represents maximum processing time required by the first terminal from triggering of the resource selection to transmitting of the trigger signaling and has a value that is configured by the network, preconfigured, or defined in a standard. A value of TP2 is determined by the physical layer of the first terminal based on an upper limit reference value of a selection window. For example, if the upper limit reference value of the selection window is PDB, then TP2<=X %×PDB, where PDB is a delay requirement of the data to be transmitted by the first terminal, and X has a value that is configured by the network, preconfigured, or defined in a standard. Alternatively, the physical layer selects within [TP2_min, the upper limit reference value of the selection window], where TP2_min has a value that is configured by the network, preconfigured, or defined in a standard. The upper limit reference value of the selection window indicates a transmission delay requirement of the trigger signaling indicated by the MAC layer of the first terminal.

Embodiment 3: In this embodiment, the first terminal transmits the trigger signaling on a first resource selected after triggering the resource reselection.

In this embodiment, after the resource reselection, the first terminal uses the first N selected resources to transmit the trigger signaling, where N>=1, and a specific value of N is configured by the network, pre-configured, or defined in a standard.

For example, after the resource reselection is triggered, the first terminal may use one or more PSSCH resources selected for transmitting the first Transport Block (TB) after the resource reselection to transmit the trigger signaling. Preferably, the trigger signaling can be transmitted via a MAC Control Element (MAC CE) in a PSSCH, or via second-stage SCI. Preferably, the trigger signaling should include at least a transmission resource pool of the first terminal, or M resources selected by the first terminal, where a value of M is smaller than or equal to a number of resources that have been selected by the first terminal. The value of M may be determined autonomously by the first terminal, or defined in a standard. For example, the trigger signaling may include all resources that have been selected by the first terminal and have not been indicated by the PSCCH.

In another example, after the resource reselection is triggered, the first terminal may use one or more PSCCH resources selected for scheduling the transmission of the first TB after the resource reselection to transmit the trigger signaling. In this case, preferably the trigger signaling is indicated by a certain reserved bit in PSCCH format 1-A.

At S240, the first terminal receives a resource set and performs corresponding operations.

After receiving the assistance information fed back by the second terminal, the first terminal excludes or selects preferentially the resource contained in the information fed back by the second terminal in the resource selection process, or the first terminal reselects the resource indicated in the assistance information fed back by the second terminal.

If the first terminal transmits the trigger signaling according to Embodiment 1 and Embodiment 2, the resource fed back by the second terminal should be suitable for the first terminal to transmit or not suitable for the first terminal to transmit within the resource selection window indicated by the trigger signaling. If the trigger signaling is transmitted according to the first example in Embodiment 3 (that is, the trigger signaling is transmitted via the PSSCH resource), the resource fed back by the second terminal should be the resource not suitable for the first terminal to transmit among the M resources indicated by the trigger signaling. If the trigger signaling is transmitted according to the second example in Embodiment 3 (that is, the trigger signaling is transmitted via the PSCCH resource), the resource fed back by the second terminal should be the resource not suitable for the first terminal to transmit among one or two retransmission resources indicated by the PSCCH.

For Embodiment 1 and Embodiment 2, if the resource fed back by the second terminal is the resource not suitable for the first terminal to transmit, the first terminal should exclude the resource in the resource selection; otherwise, the first terminal should select the resource preferentially in the resource selection.

For Embodiment 3, if the second terminal feeds back a resource set not suitable for use by the first terminal, the first terminal should reselect the resources included in the resource set fed back by the second terminal.

At S250, the method ends.

After receiving the resource set and performing the corresponding operations, the first terminal may transmit data on the selected resource.

The preferred embodiments of the present disclosure have been described in detail above with reference to the accompanying drawings. However, the present disclosure is not limited to the specific details of the above embodiments. Various simple modifications can be made to the technical solutions of the present disclosure without departing from the scope of the technical concept of the present disclosure. These simple modifications all belong to the protection scope of the present disclosure. For example, the specific technical features described in the above specific embodiments can be combined as appropriate provided that they do not conflict. In order to avoid unnecessary repetition, the description of various possible combinations will be omitted here. In another example, the embodiments of the present disclosure can also be combined as appropriate, as long as they do not violate the concept of the present disclosure, and they should also be regarded as the content disclosed in the present disclosure.

It should also be understood that, in the method embodiments of the present disclosure, the values of the sequence numbers of the above processes do not mean the order of execution, and the execution order of each process should be determined by its functions and internal logics, and the implementation of the present disclosure is not limited to any specific order. In addition, in the embodiments of the present disclosure, the terms "downlink" and "uplink" are used to indicate the transmission direction of signals or data. Here, "downlink" is used to indicate that the transmission direction of signals or data is a first direction from a station to a user equipment of a cell, and "uplink" is used to indicate that the transmission direction of signals or data is a second direction from a user equipment in a cell to a station. For example, a "downlink signal" indicates that the transmission direction of the signal is the first direction. In addition, in this embodiment of the present disclosure, the term "and/or" as used herein only represents a relationship between correlated objects, including three relationships. For example, "A and/or B" may mean A only, B only, or both A and B. In addition, the symbol "/" as used herein represents an "or" relationship between the correlated objects preceding and succeeding the symbol.

The method embodiments of the present disclosure have been described in detail above, and the apparatus embodiments of the present disclosure will be described in detail below with reference to FIGS. 13 to 16.

FIG. 13 is a schematic block diagram of a first terminal 300 according to an embodiment of the present disclosure.

As shown in FIG. 13, the first terminal 300 may include:

a determining unit 310 configured to determine whether the first terminal satisfies a condition for transmitting trigger signaling, the trigger signaling instructing a second terminal to transmit assistance information for assisting the first terminal in resource selection; and a transmitting unit 320 configured to transmit the trigger signaling when the first terminal satisfies the condition for transmitting the trigger signaling.

In some embodiments of the present disclosure, the satisfying of the condition for the transmitting the trigger signaling may include at least one of:

the first terminal having triggered resource reselection, the first terminal being to perform resource reselection, a priority of sidelink data to be transmitted by the first terminal satisfying the condition for transmitting the trigger signaling, a state of the first terminal receiving Acknowledgement (ACK) or Non-Acknowledgement (NACK) fed back from the second terminal satisfying the condition for transmitting the trigger signaling, or a delay requirement of the sidelink data to be transmitted by the first terminal satisfying the condition for transmitting the trigger signaling.

In some embodiments of the present disclosure, the first terminal being to perform resource reselection may include at least one of:

when a sidelink process of the first terminal is used for transmitting a plurality of Medium Access Control (MAC) Protocol Data Units (PDUs), a resource occupation counter SL_RESOURCE_RESELECTION_COUNTER is equal to 1, and a value of a random number randomly generated by the first terminal in [0, 1] is greater than a parameter sl-ProbResourceKeep configured by a higher layer, the first terminal being to perform resource reselection after transmission of a next MAC PDU or after the SL_RESOURCE_RESELECTION_COUNTER becomes zero;

when the sidelink process of the first terminal is used for transmitting the plurality of MAC PDUs, and the first terminal has not used any reserved resource for initial transmission or retransmission within a past predetermined time period, the first terminal being to perform resource reselection when there is sidelink data in a logical channel of the first terminal;

when the sidelink process of the first terminal is used for transmitting the plurality of MAC PDUs, and the first terminal has not transmitted any information on sl-ReselectAfter consecutive reserved resources, the first terminal being to perform resource reselection when there is sidelink data in a logical channel of the first terminal, where sl-ReselectAfter is a parameter configured by a higher layer; or when the first terminal has a sidelink granted resource, but even if the first terminal adopts a maximum Modulation and Coding Scheme (MCS) allowed by a higher layer, the sidelink granted resource cannot bear a Radio Link Control (RLC) PDU and a MAC layer of the first terminal does not segment the RLC PDU, the first terminal being to perform resource reselection.

In some embodiments of the present disclosure, the priority of the sidelink data to be transmitted by the first terminal satisfying the condition for transmitting the trigger signaling may include:

the priority of the sidelink data to be transmitted by the first terminal being higher than a first threshold.

In some embodiments of the present disclosure, the first threshold may be configured by a network device, preconfigured, or predefined.

In some embodiments of the present disclosure, the state of the first terminal receiving ACK or NACK fed back from the second terminal satisfying the condition for transmitting the trigger signaling may include at least one of:

if a receiver corresponding to the first terminal feeds back an ACK in response to successfully receiving a Physical Sidelink Shared Channel (PSSCH) transmitted by the first terminal, and feeds back an NACK in response to successfully receiving a Physical Sidelink Control Channel (PSCCH) transmitted by the first terminal but failing to receive the PSSCH transmitted by the first terminal, when a number of times the first terminal fails to receive ACK from the receiver successively is greater than a second threshold, the first terminal being to perform resource reselection; or if the receiver feeds back an NACK in response to successfully receiving the PSCCH transmitted by the first terminal but failing to receive the PSSCH transmitted by the first terminal, and does not provide any feedback otherwise, when a number of times the first terminal receives NACK from the receiver successively is greater a third threshold, the first terminal being to perform resource reselection.

In some embodiments of the present disclosure, the second threshold may be configured by a network device, preconfigured, or predefined.

In some embodiments of the present disclosure, the third threshold may be configured by a network device, preconfigured, or predefined.

In some embodiments of the present disclosure the delay requirement of the sidelink data to be transmitted by the first terminal satisfying the condition for transmitting the trigger signaling may include:

the delay requirement of the sidelink data to be transmitted by the first terminal being greater than a fourth threshold.

In some embodiments of the present disclosure, the fourth threshold may be configured by a network device, preconfigured, or predefined.

In some embodiments of the present disclosure, the transmitting unit 320 may be configured to:

transmit the trigger signaling over a resource in a sidelink grant.

In some embodiments of the present disclosure, the transmitting unit 320 may be configured to:

transmit, when the first terminal has the sidelink grant, the trigger signaling over the resource in the sidelink grant.

In some embodiments of the present disclosure, the transmitting unit 320 may be configured to:

determine, when the first terminal has the sidelink grant and the first terminal determines that the resource reselection is to be performed in time slot n, the resource in the sidelink grant as a resource for transmitting the trigger signaling, where n is a non-negative integer.

In some embodiments of the present disclosure, the resource in the sidelink grant may be determined based on a condition satisfied by the first terminal.

In some embodiments of the present disclosure, the condition satisfied by the first terminal may include:

a sidelink process of the first terminal is used for transmitting a plurality of MAC PDUs, a value of a resource occupation counter SL_RESOURCE_RESELECTION_COUNTER is equal to 1, and a value of a random number randomly generated by the first terminal in [0, 1] is greater than a parameter sl-ProbResourceKeep configured by a higher layer, the first terminal being to perform resource reselection after transmission of a next MAC PDU or after the SL_RESOURCE_RESELECTION_COUNTER becomes zero, and the transmitting unit 320 may be configured to:

transmit the trigger signaling during the transmission of the next MAC PDU.

In some embodiments of the present disclosure, the transmitting unit 320 may be configured to:

include, when a number of transmissions of the next MAC PDU is greater than one, the trigger signaling in each transmission of the MAC PDU.

In some embodiments of the present disclosure, the first terminal may further satisfy at least one of the following conditions:

the priority of the sidelink data to be transmitted by the first terminal being higher than a first threshold;

if a receiver corresponding to the first terminal feeds back an ACK in response to successfully receiving a Physical Sidelink Shared Channel (PSSCH) transmitted by the first terminal, and feeds back an NACK in response to successfully receiving a Physical Sidelink Control Channel (PSCCH) transmitted by the first terminal but failing to receive the PSSCH transmitted by the first terminal, when a number of times the first terminal fails to receive ACK from the receiver successively is greater than a second threshold, the first terminal being to perform resource reselection;

if the receiver feeds back an NACK in response to successfully receiving the PSCCH transmitted by the first terminal but failing to receive the PSSCH transmitted by the first terminal, and does not provide any feedback otherwise, when a number of times the first terminal receives NACK from the receiver successively is greater a third threshold, the first terminal being to perform resource reselection;

the delay requirement of the sidelink data to be transmitted by the first terminal being greater than a fourth threshold; or a time interval between a start of a resource selection window in the resource reselection to be performed by the first terminal and a first transmission resource of the next MAC PDU being greater than a fifth threshold.

In some embodiments of the present disclosure, the fifth threshold may be configured by a network device, preconfigured, or predefined.

In some embodiments of the present disclosure, the condition satisfied by the first terminal may include at least one of:

when the sidelink process of the first terminal is used for transmitting the plurality of MAC PDUs, and the first terminal has not used any reserved resource for initial transmission or retransmission within a past predetermined time period, the first terminal being to perform resource reselection when there is sidelink data in a logical channel of the first terminal; or when the sidelink process of the first terminal is used for transmitting the plurality of MAC PDUs, and the first terminal has not transmitted any information on sl-ReselectAfter consecutive reserved resources, the first terminal being to perform resource reselection when there is sidelink data in a logical channel of the first terminal, where sl-ReselectAfter is a parameter configured by a higher layer, and the transmitting unit 320 may be configured to:

transmit, when there is sidelink data in a logical channel of the first terminal and the resource reselection is required, the trigger signaling over last N reserved resources before the resource reselection, where N is non-negative integer.

In some embodiments of the present disclosure, a value of N may be configured by a network device, or preconfigured, or predefined.

In some embodiments of the present disclosure, the trigger signaling may be transmitted via a MAC CE in a PSSCH, or via second-stage Sidelink Control Information (SCI).

In some embodiments of the present disclosure, the condition satisfied by the first terminal may further include at least one of:

the priority of the sidelink data to be transmitted by the first terminal being higher than a first threshold;

if a receiver corresponding to the first terminal feeds back an ACK in response to successfully receiving a Physical Sidelink Shared Channel (PSSCH) transmitted by the first terminal, and feeds back an NACK in response to successfully receiving a Physical Sidelink Control Channel (PSCCH) transmitted by the first terminal but failing to receive the PSSCH transmitted by the first terminal, when a number of times the first terminal fails to receive ACK from the receiver successively is greater than a second threshold, the first terminal being to perform resource reselection;

if the receiver feeds back an NACK in response to successfully receiving the PSCCH transmitted by the first terminal but failing to receive the PSSCH transmitted by the first terminal, and does not provide any feedback otherwise, when a number of times the first terminal receives NACK from the receiver successively is greater a third threshold, the first terminal being to perform resource reselection;

the delay requirement of the sidelink data to be transmitted by the first terminal being greater than a fourth threshold; or a time interval between a start of a resource selection window in the resource reselection to be performed by the first terminal and a first transmission resource of the N reserved resources being greater than a sixth threshold.

In some embodiments of the present disclosure, the sixth threshold may be configured by a network device, or preconfigured, or predefined.

In some embodiments of the present disclosure, the condition satisfied by the first terminal may include:

when the first terminal has a sidelink granted resource, but even if the first terminal adopts a maximum Modulation and Coding Scheme (MCS) allowed by a higher layer, the sidelink granted resource cannot bear a Radio Link Control (RLC) PDU and a MAC layer of the first terminal does not segment the RLC PDU, the first terminal being to perform resource reselection, and the transmitting unit 320 may be configured to:

transmit the trigger signaling over the resource that cannot bear the RLC PDU.

In some embodiments of the present disclosure, the trigger signaling may be transmitted via a MAC CE in a PSSCH, or via second-stage Sidelink Control Information (SCI).

In some embodiments of the present disclosure, the condition satisfied by the first terminal may further include at least one of:

the priority of the sidelink data to be transmitted by the first terminal being higher than a first threshold;

if a receiver corresponding to the first terminal feeds back an ACK in response to successfully receiving a Physical Sidelink Shared Channel (PSSCH) transmitted by the first terminal, and feeds back an NACK in response to successfully receiving a Physical Sidelink Control Channel (PSCCH) transmitted by the first terminal but failing to receive the PSSCH transmitted by the first terminal, when a number of times the first terminal fails to receive ACK from the receiver successively is greater than a second threshold, the first terminal being to perform resource reselection;

if the receiver feeds back an NACK in response to successfully receiving the PSCCH transmitted by the first terminal but failing to receive the PSSCH transmitted by the first terminal, and does not provide any feedback otherwise, when a number of times the first terminal receives NACK from the receiver successively is greater a third threshold, the first terminal being to perform resource reselection;

the delay requirement of the sidelink data to be transmitted by the first terminal being greater than a fourth threshold; or a time interval between a start of a resource selection window in the resource reselection to be performed by the first terminal and the resource that cannot bear the RLC PDU being greater than a seventh threshold.

In some embodiments of the present disclosure, the seventh threshold may be configured by a network device, preconfigured, or predefined.

In some embodiments of the present disclosure, the transmitting unit 320 may be configured to:

transmit the trigger signaling over a randomly selected resource.

In some embodiments of the present disclosure, the transmitting unit 320 may be configured to:

transmit, when the first terminal has no sidelink grant, the trigger signaling over the randomly selected resource.

In some embodiments of the present disclosure, the randomly selected resource may be determined by a condition satisfied by the first terminal.

In some embodiments of the present disclosure, the first terminal may satisfy at least one of the following conditions:

the first terminal having triggered the resource reselection, and the priority of the sidelink data to be transmitted by the first terminal being higher than a first threshold; or the first terminal having triggered the resource reselection, and if a receiver corresponding to the first terminal feeds back an ACK in response to successfully receiving a Physical Sidelink Shared Channel (PSSCH) transmitted by the first terminal, and feeds back an NACK in response to successfully receiving a Physical Sidelink Control Channel (PSCCH) transmitted by the first terminal but failing to receive the PSSCH transmitted by the first terminal, when a number of times the first terminal fails to receive ACK from the receiver successively is greater than a second threshold, the first terminal being to perform resource reselection, and the transmitting unit 320 may be configured to:

select, when the first terminal is configured with an exceptional resource pool, the resource randomly in the exceptional resource pool; and transmit the trigger signaling over the randomly selected resource.

In some embodiments of the present disclosure, the trigger signaling may be transmitted via a MAC CE in a PSSCH, or via second-stage Sidelink Control Information (SCI).

In some embodiments of the present disclosure, the condition satisfied by the first terminal may further include:

the delay requirement of the sidelink data to be transmitted by the first terminal being greater than a fourth threshold.

In some embodiments of the present disclosure, the first terminal may satisfy at least one of the following conditions:

if a receiver corresponding to the first terminal feeds back an ACK in response to successfully receiving a Physical Sidelink Shared Channel (PSSCH) transmitted by the first terminal, and feeds back an NACK in response to successfully receiving a Physical Sidelink Control Channel (PSCCH) transmitted by the first terminal but failing to receive the PSSCH transmitted by the first terminal, when a number of times the first terminal fails to receive ACK from the receiver successively is greater than a second threshold, the first terminal being to perform resource reselection; or if the receiver feeds back an NACK in response to successfully receiving the PSCCH transmitted by the first terminal but failing to receive the PSSCH transmitted by the first terminal, and does not provide any feedback otherwise, when a number of times the first terminal receives NACK from the receiver successively is greater a third threshold, the first terminal being to perform resource reselection, and the transmitting unit 320 may be configured to:

select, when the first terminal is configured with an exceptional resource pool, the resource randomly in the exceptional resource pool for transmitting the triggering signaling.

In some embodiments of the present disclosure, the trigger signaling may be transmitted via a MAC CE in a PSSCH, or via second-stage Sidelink Control Information (SCI).

In some embodiments of the present disclosure, the random selection may be performed at a MAC layer of the first terminal, and the MAC layer of the first terminal may select the resource for transmitting the trigger signaling within [TM1, TM2].

In some embodiments of the present disclosure, a value of TM1 may be autonomously selected by the first terminal or TM1<=n+Tproc, where n represents time at which the first terminal triggers the resource selection, and Tproc represents maximum processing time required by the first terminal from triggering of the resource selection to transmitting of the trigger signaling and has a value that is configured by a network device, preconfigured, or predefined, a value of TM2 may be autonomously selected by the first terminal or TM2<=X %×PDB, where PDB is a delay requirement of the sidelink data to be transmitted by the first terminal, and X has a value that is configured by a network device, preconfigured, or predefined.

In some embodiments of the present disclosure, the random selection may be performed at a physical layer of the first terminal, and a MAC layer of the first terminal may provide the physical layer with a configuration of an exceptional resource pool such that the physical layer selects the resource for transmitting the trigger signaling within [TP1, TP2].

In some embodiments of the present disclosure, a value of TP1 may be autonomously selected by the first terminal or TP1<=n+Tproc, where n represents time at which the first terminal triggers the resource selection, and Tproc represents maximum processing time required by the first terminal from triggering of the resource selection to transmitting of the trigger signaling and has a value that is configured by a network device, preconfigured, or predefined, a value of TP2 may be determined based on an upper limit reference value of a selection window in the configuration of the exceptional resource pool, and the upper limit reference value of the selection window indicates a transmission delay requirement of the trigger signaling indicated by the MAC layer of the first terminal.

In some embodiments of the present disclosure, the upper limit reference value of the selection window may be PDB, and TP2<=X %×PDB, where PDB is a delay requirement of the sidelink data to be transmitted by the first terminal, and X has a value that is configured by a network device, preconfigured, or predefined, or the physical layer selects within [TP2_min, the upper limit reference value of the selection window], where TP2_min has a value that is configured by a network device, preconfigured, or predefined.

In some embodiments of the present disclosure, the trigger signaling may include at least one of:

a transmission resource pool of the first terminal, a priority prio_TX of sidelink data to be transmitted by the first terminal, a start and an end of a resource selection window in resource selection to be performed by the first terminal, a delay requirement of the sidelink data to be transmitted by the terminal, a frequency domain resource size L_subCH used in the resource selection to be performed by the first terminal, or a resource reservation period P_rsvp_TX used in the resource selection to be performed by the first terminal.

In some embodiments of the present disclosure, the transmitting unit 320 may be further configured to:

receive the assistance information, the assistance information including a resource suitable for transmission by the first terminal and/or a resource not suitable for the first terminal in the resource pool indicated by the first terminal; and select, when the assistance information includes the resource suitable for transmission by the first terminal, the resource suitable for transmission by the first terminal preferentially in the resource selection, or excluding, by the first terminal when the assistance information includes the resource not suitable for transmission by the first terminal, the resource not suitable for transmission by the first terminal preferentially in the resource selection.

In some embodiments of the present disclosure, the transmitting unit 320 may be configured to:

transmit the trigger signaling on a first resource selected in resource reselection.

In some embodiments of the present disclosure, the transmitting unit 320 may be configured to:

transmit the trigger signaling using first W resources selected by the first terminal in the resource reselection, where W>=1.

In some embodiments of the present disclosure, a value of W may be configured by a network device, preconfigured, or predefined.

In some embodiments of the present disclosure, the transmitting unit 320 may be configured to:

transmit the trigger signaling on one or more PSSCH resources used for transmitting a first transport block after the resource reselection.

In some embodiments of the present disclosure, the trigger signaling may be transmitted via a MAC CE in a PSSCH, or via second-stage Sidelink Control Information (SCI).

In some embodiments of the present disclosure, the trigger signaling may include at least one of:

a transmission resource pool of the first terminal, or M resources selected by the first terminal, where a value of M is smaller than or equal to a number of resources that have been selected by the first terminal.

In some embodiments of the present disclosure, the M resources selected by the first terminal may include all resources that have been selected by the first terminal and have not been indicated by the PSCCH.

In some embodiments of the present disclosure, the transmitting unit 320 may be further configured to:

receive the assistance information, the assistance information including a resource not suitable for the first terminal among the M resources; and exclude the resource not suitable for transmission by the first terminal preferentially in the resource selection.

In some embodiments of the present disclosure, the transmitting unit 320 may be configured to:

transmit the trigger signaling on one or more PSSCH resources used for transmitting a first transport block after the resource reselection.

In some embodiments of the present disclosure, the trigger signaling may be indicated by a reserved bit in PSCCH format 1-A.

In some embodiments of the present disclosure, the transmitting unit 320 may be further configured to:

receive the assistance information, the assistance information including a resource not suitable for the first terminal among one or two resources indicated by the reserved bit in the PSCCH format 1-A; and exclude the resource not suitable for transmission by the first terminal preferentially in the resource selection.

FIG. 14 is a schematic block diagram of a second terminal 400 according to an embodiment of the present disclosure.

As shown in FIG. 14, the second terminal 400 may include:

a receiving unit 410 configured to receive trigger signaling instructing the second terminal to transmit assistance information for assisting a first terminal in resource selection.

In some embodiments of the present disclosure, the trigger signaling may include at least one of:

a transmission resource pool of the first terminal, a priority prio_TX of sidelink data to be transmitted by the first terminal, a start and an end of a resource selection window in resource selection to be performed by the first terminal, a delay requirement of the sidelink data to be transmitted by the terminal, a frequency domain resource size L_subCH used in the resource selection to be performed by the first terminal, or a resource reservation period P_rsvp_TX used in the resource selection to be performed by the first terminal.

In some embodiments of the present disclosure, the receiving unit 410 may be further configured to:

transmit the assistance information, the assistance information including a resource suitable for transmission by the first terminal and/or a resource not suitable for the first terminal in the resource pool indicated by the first terminal.

In some embodiments of the present disclosure, the trigger signaling may include at least one of:

a transmission resource pool of the first terminal, or M resources selected by the first terminal, where a value of M is smaller than or equal to a number of resources that have been selected by the first terminal.

In some embodiments of the present disclosure, the M resources selected by the first terminal may include all resources that have been selected by the first terminal and have not been indicated by the PSCCH.

In some embodiments of the present disclosure, the receiving unit 410 may be further configured to:

transmit the assistance information, the assistance information including a resource not suitable for the first terminal among the M resources.

In some embodiments of the present disclosure, the receiving unit 410 may be configured to:

receive the trigger signaling on one or more PSSCH resources.

In some embodiments of the present disclosure, the trigger signaling may be received via a MAC CE in a PSSCH, or via second-stage Sidelink Control Information (SCI).

In some embodiments of the present disclosure, the trigger signaling may include at least one of:

A transmission resource pool of the first terminal, or M resources selected by the first terminal, where a value of M is smaller than or equal to a number of resources that have been selected by the first terminal.

In some embodiments of the present disclosure, the M resources selected by the first terminal may include all resources that have been selected by the first terminal and have not been indicated by the PSCCH.

In some embodiments of the present disclosure, the receiving unit 410 may be further configured to:

transmit the assistance information, the assistance information including a resource not suitable for the first terminal among the M resources.

In some embodiments of the present disclosure, the receiving unit 410 may be configured to:

receive the trigger signaling on one or more PSSCH resources.

In some embodiments of the present disclosure, the trigger signaling may be indicated by a reserved bit in PSCCH format 1-A.

In some embodiments of the present disclosure, the receiving unit 410 may be further configured to:

transmit the assistance information, the assistance information including a resource not suitable for the first terminal among one or two resources indicated by the reserved bit in the PSCCH format 1-A.

It should be understood that the apparatus embodiments and the method embodiments may correspond to each other, and for similar descriptions, reference can be made to the method embodiments. In particular, the first terminal 300 as shown in FIG. 13 may correspond to the corresponding entity for performing the method 100 according to the embodiment of the present disclosure, and the above and other operations and/or functions of the respective units in the first terminal 300 are provided for implementing the corresponding processes in the respective methods in FIG. 10. Similarly, the second terminal 400 as shown in FIG. 14 may correspond to the corresponding entity for performing the method 100 according to the embodiment of the present disclosure, and the above and other operations and/or functions of the respective units in the second terminal 400 are provided for implementing the corresponding processes in the respective methods in FIG. 10. For brevity, details thereof will be omitted here.

The communication device according to the embodiment of the present disclosure has been described above from the perspective of functional modules with reference to the accompanying drawings. It should be understood that the functional modules can be implemented in the form of hardware, software instructions, or a combination of hardware and software modules. Specifically, the steps of the method embodiments in the embodiments of the present disclosure may be implemented by hardware integrated logic circuits in the processor and/or software instructions, and the steps of the methods disclosed in conjunction with the embodiments of the present disclosure may be directly embodied as implemented by a hardware decoding processor or a combination of hardware and software modules in a decoding processor. Optionally, the software modules may be located in a random access memory, a flash memory, a read-only memory, a programmable read-only memory, an electrically erasable programmable memory, a register, and other storage media known in the art. The storage medium is located in the memory, and the processor reads the information in the memory, and performs the steps in the above method embodiments in combination with its hardware.

For example, the processing unit and the communication unit above may be implemented by a processor and a transceiver, respectively.

Figures 15, 16:
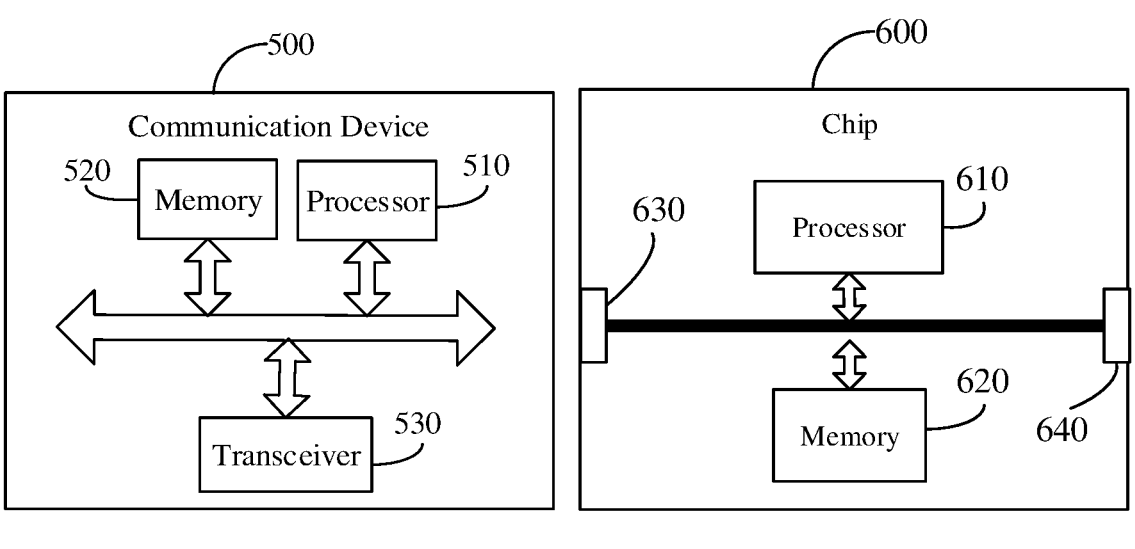
FIG. 15 is a schematic block diagram of a communication device according to an embodiment of the present disclosure.
FIG. 16 is a schematic block diagram of a chip according to an embodiment of the present disclosure.

FIG. 15 is a schematic diagram showing a structure of a communication device 500 according to an embodiment of the present disclosure.

As shown in FIG. 15, the communication device 500 includes a processor 510.

Here, the processor 510 can invoke and execute a computer program from a memory to implement the method in the embodiment of the present disclosure.

Referring to FIG. 15 again, the communication device 500 may further include a memory 520.

Here, the memory 520 may store indication information, and may further store codes, instructions, etc. to be executed by the processor 510. The processor 510 can invoke and execute a computer program from the memory 520 to implement the method in the embodiment of the present disclosure. The memory 520 may be a separate device independent from the processor 510, or may be integrated in the processor 810.

Referring to FIG. 15 again, the communication device 500 may further include a transceiver 530.

Here, the processor 510 may control the transceiver 530 to communicate with other devices, and in particular, transmit information or data to other devices, or receive information or data transmitted by other devices. The transceiver 530 may include a transmitter and a receiver. The transceiver 530 may further include one or more antennas.

It can be appreciated that the components in the communication device 500 may be connected via a bus system. Here, the bus system may include a power bus, a control bus and a status signal bus, in addition to a data bus.

It can be appreciated that the communication device 500 may be the first terminal according to the embodiment of the present disclosure, and the communication device 500 may implement the corresponding processes implemented by the first terminal in any of the methods according to the embodiments of the present disclosure. That is, the communication device 500 in the embodiment of the present disclosure may correspond to the first terminal 300 in the embodiment of the present disclosure, and may correspond to the corresponding entity that performs the method 100 according to the embodiment of the present disclosure. For the sake of brevity, details thereof will be omitted here. Similarly, the communication device 500 may be the second terminal according to the embodiment of the present disclosure, and the communication device 500 may implement the corresponding processes implemented by the second terminal in any of the methods according to the embodiments of the present disclosure. That is, the communication device 500 in the embodiment of the present disclosure may correspond to the second terminal 400 in the embodiment of the present disclosure, and may correspond to the corresponding entity that performs the method 100 according to the embodiment of the present disclosure. For the sake of brevity, details thereof will be omitted here.

In addition, an embodiment of the present disclosure also provides a chip.

For example, the chip may be an integrated circuit chip, which has a signal processing capability, and can implement or perform any of the methods, steps, and logic block diagrams disclosed in the embodiments of the present disclosure. The chip may also be referred to as a system level chip, a system chip, a chip system, a system-on-a-chip, or the like. Optionally, the chip can be applied in various communication devices, such that the communication device installed with the chip can perform the methods, steps and logic block diagrams disclosed in the embodiments of the present disclosure.

FIG. 16 is a schematic diagram showing a structure of a chip 600 according to an embodiment of the present disclosure.

As shown in FIG. 16, the chip 600 includes a processor 610.

Here, the processor 610 can invoke and execute a computer program from a memory to implement the method in the embodiment of the present disclosure.

Referring to FIG. 16 again, the chip 600 may further include a memory 620.

Here, the processor 610 can invoke and execute a computer program from the memory 620 to implement the method in the embodiment of the present disclosure. The memory 620 may store indication information, and may further store codes, instructions, etc. to be executed by the processor 610. The memory 620 may be a separate device independent from the processor 610, or may be integrated in the processor 610.

Referring to FIG. 16 again, the chip 600 may further include an input interface 630.

Here, the processor 610 can control the input interface 630 to communicate with other devices or chips, and in particular, obtain information or data transmitted by other devices or chips.

Referring to FIG. 16 again, the chip 600 may further include an output interface 640.

Here, the processor 610 can control the output interface 640 to communicate with other devices or chips, and in particular, output information or data to other devices or chips.

It can be appreciated that the chip 600 may be applied in the first terminal according to the embodiment of the present disclosure, and the chip 600 may implement the corresponding processes implemented by the first terminal in any of the methods according to the embodiments of the present disclosure, or the corresponding processes implemented by the second terminal in any of the methods according to the embodiments of the present disclosure. For the sake of brevity, details thereof will be omitted here.

It can be appreciated that the components in the chip 600 may be connected via a bus system. Here, the bus system may include a power bus, a control bus and a status signal bus, in addition to a data bus.

The above processor may include, but not limited to, a general purpose processor, a Digital Signal Processor (DSP), an Application Specific Integrated Circuit (ASIC), a Field Programmable Gate Array (FPGA) or another programmable logic device, a discrete gate or transistor logic device, or a discrete hardware component.

The methods, steps, and logical block diagrams disclosed in the embodiments of the present disclosure can be implemented or performed by the processor. The steps of the methods disclosed in the embodiments of the present disclosure may be directly embodied as being performed and completed by a hardware decoding processor, or by a combination of hardware and software modules in the decoding processor. The software modules can be located in a known storage medium in the related art, such as random access memory, flash memory, read-only memory, programmable read-only memory, erasable programmable memory, or register. The storage medium can be located in the memory, and the processor can read information from the memory and perform the steps of the above methods in combination with its hardware.

The above memory may include, but not limited to, a volatile memory and/or a non-volatile memory. Here, the non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), which is used as an external cache. As illustrative, rather than limiting, examples, many forms of RAMs are available, including Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM)), and Direct Rambus RAM (DR RAM).

It is to be noted that the memory used for the system and method described in the present disclosure is intended to include these and any other suitable types of memories.

An embodiment of the present disclosure also provides a computer readable storage medium for storing a computer program. The computer readable storage medium stores one or more programs including instructions which, when executed by a portable electronic device including a plurality of application programs, cause the portable electronic device to perform the method according to any of the embodiments of the present disclosure. Optionally, the computer readable storage medium may be applied to the first terminal in the embodiment of the present disclosure, and the computer program causes the computer to execute the corresponding process implemented by the first terminal in any of the methods according to the embodiments of the present disclosure. For the sake of brevity, details thereof will be omitted here. Optionally, the computer readable storage medium can be applied to the second terminal in the embodiment of the present disclosure, and the computer program causes the computer to execute the corresponding process implemented by the second terminal in any of the methods according to the embodiments of the present disclosure. For the sake of brevity, details thereof will be omitted here.

An embodiment of the present disclosure also provides a computer program product including a computer program. Optionally, the computer program product can be applied to the first terminal in the embodiment of the present disclosure, and the computer program can cause a computer to perform corresponding procedures implemented by the first terminal in the method according to any of the embodiments of the present disclosure. Details thereof will be omitted here for simplicity.

Optionally, the computer program product can be applied to the second terminal in the embodiment of the present disclosure, and the computer program can cause a computer to perform corresponding procedures implemented by the second terminal in the method according to any of the embodiments of the present disclosure. Details thereof will be omitted here for simplicity.

An embodiment of the present disclosure also provides a computer program which, when executed by a computer, causes the computer to perform the method according to any of the embodiments of the present disclosure. Optionally, the computer program can be applied to the first terminal in the embodiment of the present disclosure. The computer program, when executed by a computer, can cause the computer to perform corresponding procedures implemented by the first terminal in the method according to any of the embodiments of the present disclosure. Details thereof will be omitted here for simplicity. Optionally, the computer program can be applied to the second terminal in the embodiment of the present disclosure. The computer program, when executed on a computer, can cause the computer to perform corresponding procedures implemented by the second terminal in the method according to any of the embodiments of the present disclosure. Details thereof will be omitted here for simplicity.

In addition, an embodiment of the present disclosure further provides a communication system, which may include the above terminal devices (including the first terminal and the second terminal) and network device to form the communication system. Details thereof will be omitted here for simplicity. It should be noted that the term "system" and the like as used herein may also be referred to as "network management architecture" or "network system" or the like.

It should also be understood that the terms used in the embodiments of the present disclosure and the claims as attached are only for the purpose of describing specific embodiments, and are not intended to limit the embodiments of the present disclosure. For example, as used in the embodiments of the present disclosure and the claims as attached, the singular forms "a," "the," "above," and "said" are intended to include the plural forms as well, unless the context clearly indicates otherwise.

It can be appreciated by those skilled in the art that units and algorithm steps in the examples described in connection with the embodiments disclosed herein can be implemented in electronic hardware or any combination of computer software and electronic hardware. Whether these functions are executed by hardware or software depends on specific applications and design constraint conditions of the technical solutions. Those skilled in the art may use different methods for each specific application to implement the described functions, and such implementation is to be encompassed by the scope of the embodiments of the present disclosure. When the function is implemented in the form of a software functional unit and sold or used as a standalone product, it can be stored in a computer readable storage medium. Based on this understanding, all or part of the technical solutions according to the embodiments of the present disclosure, or the part thereof that contributes to the prior art, can be embodied in the form of a software product. The computer software product may be stored in a storage medium and contain instructions to cause a computer device, such as a personal computer, a server, or a network device, etc., to perform all or part of the steps of the method described in the embodiments of the present disclosure. The storage medium may include a Universal Serial Bus flash drive, a mobile hard disk, a Read-Only Memory (ROM), a Random Access Memory (RAM), a magnetic disk, an optical disc, or any other medium capable of storing program codes.

In the embodiments of the present disclosure, it can be appreciated that the disclosed systems, devices, and methods may be implemented in other ways. For example, the divisions of the units or modules or components in the apparatus embodiments as described above are only divisions based on logical functions, and there may be other divisions in actual implementations. For example, more than one unit or module or component may be combined or integrated into another system, or some units or modules or components can be ignored or omitted. In another example, the units/modules/components described above as separate/explicit components may or may not be physically separated, that is, they may be co-located or distributed across a number of network elements. Some or all of the units/modules/components may be selected according to actual needs to achieve the objects of the embodiments of the present disclosure. Finally, it is to be noted that the mutual coupling or direct coupling or communicative connection as shown or discussed above may be indirect coupling or communicative connection between devices or units via some interfaces which may be electrical, mechanical, or in any other forms.

While the specific embodiments of the present disclosure have been described above, the scope of the embodiments of the present disclosure is not limited to these embodiments. Various variants and alternatives can be made by those skilled in the art without departing from the scope of the embodiments of the present disclosure. These variants and alternatives are to be encompassed by the scope of the embodiments of present disclosure as defined by the claims as attached.

What is claimed is:

1. A transmission method for trigger signaling, comprising:

determining, by a first terminal, whether the first terminal satisfies a condition for transmitting trigger signaling, the trigger signaling instructing a second terminal to transmit assistance information for assisting the first terminal in resource selection; and transmitting, by the first terminal, the trigger signaling when the first terminal satisfies the condition for transmitting the trigger signaling;

wherein said satisfying the condition for the transmitting the trigger signaling comprises:

a delay requirement of the sidelink data to be transmitted by the first terminal satisfying the condition for transmitting the trigger signaling.

2. The method according to claim 1, wherein the delay requirement of the sidelink data to be transmitted by the first terminal satisfying the condition for transmitting the trigger signaling comprises:

the delay requirement of the sidelink data to be transmitted by the first terminal being greater than a threshold.

3. The method according to claim 2, wherein the threshold is configured by a network device, preconfigured, or predefined.

4. The method according to claim 1, wherein said transmitting, by the first terminal, the trigger signaling comprises:

transmitting, by the first terminal, the trigger signaling over a resource in a sidelink grant.

5. The method according to claim 4, wherein said transmitting, by the first terminal, the trigger signaling over the resource in the sidelink grant comprises:

transmitting, by the first terminal when the first terminal has the sidelink grant, the trigger signaling over the resource in the sidelink grant.

6. The method according to claim 4, wherein the trigger signaling is transmitted via a Medium Access Control (MAC) Control Element (CE) in a Physical Sidelink Shared Channel (PSSCH), or via second-stage Sidelink Control Information (SCI).

7. The method according to claim 4, wherein the trigger signaling comprises at least one of:

a transmission resource pool of the first terminal, a priority prio_TX of sidelink data to be transmitted by the first terminal, a start and an end of a resource selection window in resource selection to be performed by the first terminal, a delay requirement of the sidelink data to be transmitted by the first terminal, a frequency domain resource size L_subCH used in the resource selection to be performed by the first terminal, or a resource reservation period P_rsvp_TX used in the resource selection to be performed by the first terminal.

8. The method according to claim 7, further comprising:

receiving, by the first terminal, the assistance information, the assistance information comprising at least one of a resource suitable for transmission by the first terminal or a resource not suitable for the first terminal in the resource pool indicated by the first terminal; and selecting, by the first terminal when the assistance information comprises the resource suitable for transmission by the first terminal, the resource suitable for transmission by the first terminal preferentially in the resource selection, or excluding, by the first terminal when the assistance information comprises the resource not suitable for transmission by the first terminal, the resource not suitable for transmission by the first terminal preferentially in the resource selection.

9. A transmission method for trigger signaling, comprising:

receiving, by a second terminal, trigger signaling instructing the second terminal to transmit assistance information for assisting a first terminal in resource selection, the trigger signaling transmitting by the first terminal when the first terminal satisfies a condition for transmitting the trigger signaling;

wherein said satisfying the condition for the transmitting the trigger signaling comprises:

a delay requirement of the sidelink data to be transmitted by the first terminal satisfying the condition for transmitting the trigger signaling.

10. The method according to claim 9, wherein the trigger signaling comprises at least one of:

a transmission resource pool of the first terminal, a priority prio_TX of sidelink data to be transmitted by the first terminal, a start and an end of a resource selection window in resource selection to be performed by the first terminal, a delay requirement of the sidelink data to be transmitted by the first terminal, a frequency domain resource size L_subCH used in the resource selection to be performed by the first terminal, or a resource reservation period P_rsvp_TX used in the resource selection to be performed by the first terminal.

11. The method according to claim 10, further comprising:

transmitting, by the second terminal, the assistance information, the assistance information comprising at least one of a resource suitable for transmission by the first terminal or a resource not suitable for the first terminal in the resource pool indicated by the first terminal.

12. A second terminal, comprising a processor, a memory, and a transceiver, wherein the memory has a computer program stored thereon, and the processor is configured to invoke and execute the computer program stored in the memory to perform the method according to claim 9.

13. A first terminal, comprising a processor, a memory, and a transceiver, wherein the memory has a computer program stored thereon, and the processor is configured to invoke and execute the computer program stored in the memory to:

determine whether the first terminal satisfies a condition for transmitting trigger signaling, the trigger signaling instructing a second terminal to transmit assistance information for assisting the first terminal in resource selection; and transmit the trigger signaling when the first terminal satisfies the condition for transmitting the trigger signaling;

wherein said satisfying the condition for the transmitting the trigger signaling comprises:

a delay requirement of the sidelink data to be transmitted by the first terminal satisfying the condition for transmitting the trigger signaling.

14. The first terminal according to claim 13, wherein the delay requirement of the sidelink data to be transmitted by the first terminal satisfying the condition for transmitting the trigger signaling comprises:

the delay requirement of the sidelink data to be transmitted by the first terminal being greater than a threshold.

15. The first terminal according to claim 14, wherein the threshold is configured by a network device, preconfigured, or predefined.

16. The first terminal according to claim 13, wherein said transmitting the trigger signaling comprises:

transmitting the trigger signaling over a resource in a sidelink grant.

17. The first terminal according to claim 16, wherein said transmitting the trigger signaling over the resource in the sidelink grant comprises:

transmitting, when the first terminal has the sidelink grant, the trigger signaling over the resource in the sidelink grant.

18. The first terminal according to claim 16, wherein the trigger signaling is transmitted via a Medium Access Control (MAC) Control Element (CE) in a Physical Sidelink Shared Channel (PSSCH), or via second-stage Sidelink Control Information (SCI).

19. The first terminal according to claim 16, wherein the trigger signaling comprises at least one of:

a transmission resource pool of the first terminal, a priority prio_TX of sidelink data to be transmitted by the first terminal, a start and an end of a resource selection window in resource selection to be performed by the first terminal, a delay requirement of the sidelink data to be transmitted by the first terminal, a frequency domain resource size L_subCH used in the resource selection to be performed by the first terminal, or a resource reservation period P_rsvp_TX used in the resource selection to be performed by the first terminal.

20. The first terminal according to claim 19, wherein the processor is further configured to invoke and execute the computer program stored in the memory to:

receive the assistance information, the assistance information comprising at least one of a resource suitable for transmission by the first terminal or a resource not suitable for the first terminal in the resource pool indicated by the first terminal; and select when the assistance information comprises the resource suitable for transmission by the first terminal, the resource suitable for transmission by the first terminal preferentially in the resource selection, or exclude when the assistance information comprises the resource not suitable for transmission by the first terminal, the resource not suitable for transmission by the first terminal preferentially in the resource selection.

* * * * *